(12) United States Patent
Florczak et al.

(10) Patent No.: US 9,307,307 B2
(45) Date of Patent: Apr. 5, 2016

(54) PORTABLE WIRELESS WATERPROOF SPEAKERS

(71) Applicant: Grace Digital, Inc., San Diego, CA (US)

(72) Inventors: James Florczak, San Diego, CA (US); Greg William Fadul, San Diego, CA (US); James D. Palmer, Jr., San Diego, CA (US)

(73) Assignee: Grace Digital, Inc., San Diego, CA (US)

( * ) Notice: Subject to any disclaimer, the term of this patent is extended or adjusted under 35 U.S.C. 154(b) by 148 days.

(21) Appl. No.: 14/045,748

(22) Filed: Oct. 3, 2013

(65) Prior Publication Data

US 2015/0098582 A1    Apr. 9, 2015

(51) Int. Cl.
*H04R 1/02* (2006.01)
*H04M 1/04* (2006.01)
*H04B 1/38* (2015.01)
*H04R 1/08* (2006.01)
*H04R 1/28* (2006.01)
*H04R 29/00* (2006.01)

(52) U.S. Cl.
CPC . *H04R 1/02* (2013.01); *H04M 1/04* (2013.01); H04B 2001/3894 (2013.01); *H04R 1/023* (2013.01); *H04R 1/086* (2013.01); *H04R 1/288* (2013.01); *H04R 29/001* (2013.01); *H04R 2420/07* (2013.01)

(58) Field of Classification Search
CPC ................................................ H04B 2001/3894
USPC ............ 455/90.3, 575.8; 381/77, 333; 244/65
See application file for complete search history.

(56) References Cited

U.S. PATENT DOCUMENTS

| | | | |
|---|---|---|---|
| 7,945,067 B2 | 5/2011 | Mott et al. | |
| 8,311,595 B2 | 11/2012 | Takatsuka et al. | |
| 2004/0195438 A1* | 10/2004 | Chamberlain | 244/65 |
| 2011/0075874 A1 | 3/2011 | Richards | |
| 2012/0276940 A1 | 11/2012 | Lever | |
| 2013/0279729 A1* | 10/2013 | Richards | 381/333 |

* cited by examiner

*Primary Examiner* — Md S Elahee
(74) *Attorney, Agent, or Firm* — Genius Patent APC; Bruce Hare

(57) ABSTRACT

A portable speaker system includes: a waterproof enclosure; a wireless communication element enclosed within the waterproof enclosure, the wireless communication element able to receive audio data from a mobile device; a pair of speakers enclosed within the waterproof enclosure that are able to generate an audio output based on the audio data received from the mobile device; and a set of connection ports located within a first recessed area of the waterproof enclosure, the first recessed area including a flexible cover that is able to expose the first recessed area when in an open position and form a waterproof seal with the waterproof enclosure when in a closed position.

14 Claims, 26 Drawing Sheets

PORTABLE WIRELESS WATERPROOF SPEAKERS

BACKGROUND

Mobile devices such as smartphones, tablets, laptops, etc. are ubiquitous in society. Many users may "play" multimedia content (e.g., music, videos, etc.) using such mobile devices. In many cases, a user may want to play such content through an external element (e.g., an external set of speakers).

Existing solutions may force a user to physically connect a mobile device using one or more cables, thus limiting the freedom of the user to move the mobile device and/or use the mobile device for other functions (e.g., making and/or receiving phone calls).

In addition, existing solutions may not be able to withstand typical operating conditions to which some such elements may be subjected (e.g., water, dust, physical impacts, etc.).

Therefore, there exists a need for a set of speakers within a waterproof enclosure featuring shock resistance and wireless connectivity.

BRIEF SUMMARY

Some embodiments may provide a multimedia device that is able to provide various appropriate outputs (e.g., audio, video, etc.). The device may be housed in an enclosure that is adapted to be waterproof, dustproof, shockproof, and/or otherwise protected from external environment conditions and/or forces.

The multimedia device may be able to connect to one or more mobile devices (e.g., a smartphone, PC, tablet, etc.) such that the multimedia device may receive data associated with multimedia content and generate outputs (e.g., audible sound, visible graphics, etc.) associated with the content.

A first exemplary embodiment of the invention provides a portable speaker system. The portable speaker system includes: a waterproof enclosure; a wireless communication element enclosed within the waterproof enclosure, the wireless communication element able to receive audio data from a mobile device; a pair of speakers enclosed within the waterproof enclosure that are able to generate an audio output based on the audio data received from the mobile device; and a set of connection ports located within a first recessed area of the waterproof enclosure, the first recessed area including a flexible cover that is able to expose the first recessed area when in an open position and form a waterproof seal with the waterproof enclosure when in a closed position.

A second exemplary embodiment of the invention provides a device adapted to provide multimedia content. The device includes: a communication module adapted to be able to be communicatively coupled to a mobile device via a communication link; a processor adapted to receive multimedia data over the communication link; and a set of output elements adapted to generate user-sensible outputs based at least partly on the received multimedia data.

A third exemplary embodiment of the invention provides a multimedia playback device. The multimedia playback device includes: a waterproof enclosure; a set of user interface (UI) features; a set of audio output elements; a set of audio input elements; at least one connection port; a wireless communication element; and a rechargeable battery.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Although various examples provided below may include audio content, one of ordinary skill will recognize that other types of multimedia content (e.g., video content, audio-visual content, graphics, etc.) may be provided by some embodiments. Similarly, although inputs such as microphones may be discussed in reference to specific examples, some embodiments may include other types of inputs (e.g., still and/or video cameras, motion and/or position sensing elements, etc.). Likewise, various examples may refer to speakers as outputs, but some embodiments may include other types of outputs (e.g., video displays, sensory outputs such as vibration, etc.).

In addition, although various examples below may describe "waterproof" properties of one or more elements, one of ordinary skill in the art will recognize that such elements may provide other associated properties (e.g., dust-proof properties).

Several more detailed embodiments of the invention are described in the sections below. Section I provides a conceptual description of a system of some embodiments. Next, Section II describes various enclosure features of some embodiments. Section III then describes various methods of operation used by some embodiments. Next, Section IV describes exemplary implementations of some embodiments. Lastly, Section V describes a computer system which may be used with some embodiments of the invention.

I. System

Sub-section I.A provides a conceptual description of various external features provided by some embodiments. Sub-section I.B then describes a conceptual hardware architecture of some embodiments. Lastly, sub-section I.C describes a conceptual software architecture of some embodiments.

A. External Features

Figure 1:
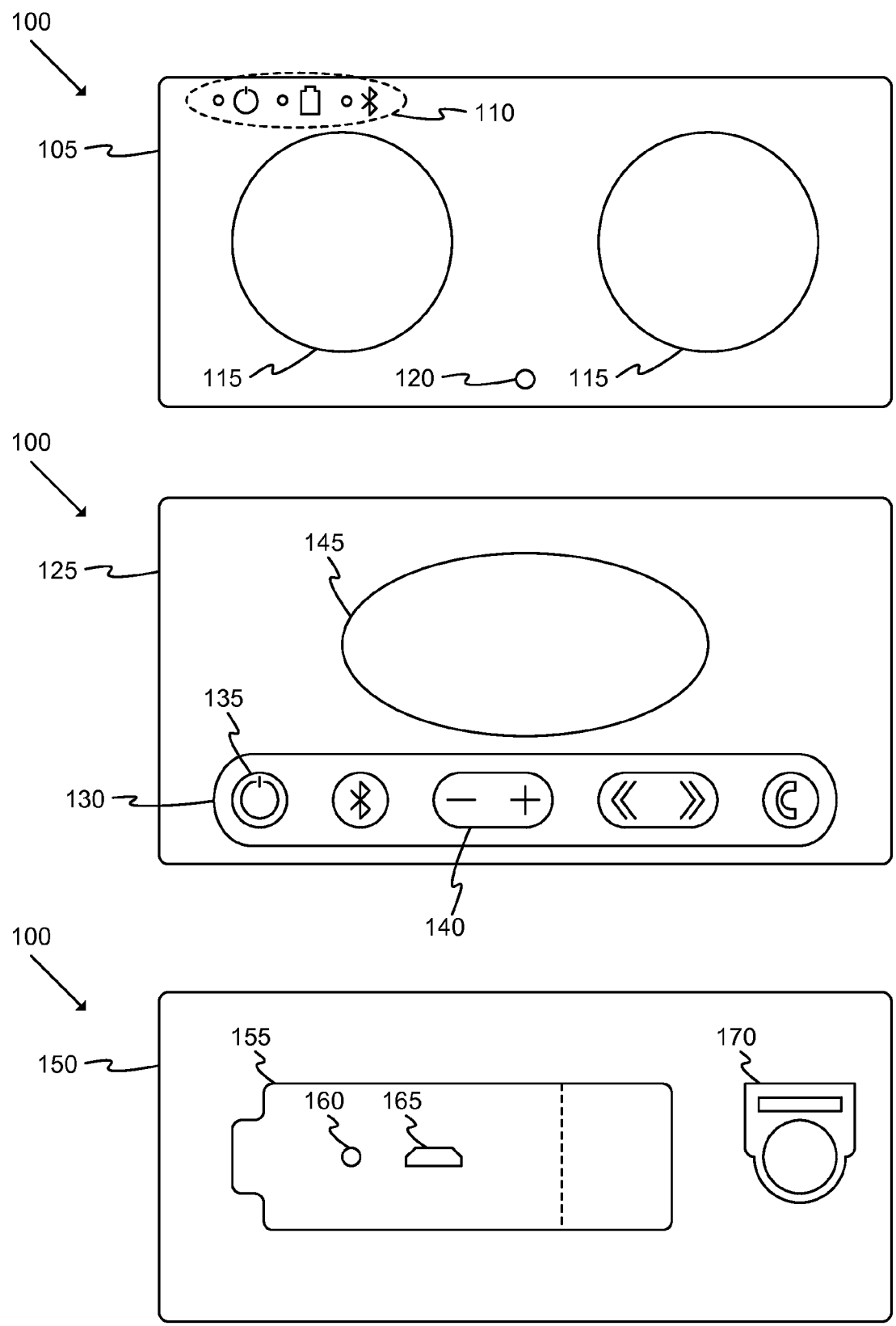
FIG. 1 illustrates several views of a playback element according to an exemplary embodiment of the invention.

FIG. 1 illustrates a front view, top view, and rear view of a conceptual playback element 100 according to an exemplary embodiment of the invention. Specifically, this illustration shows various external features of the playback element.

As shown, the front face 105 may include various indicator elements 110, a set of speakers 115, and a microphone 120.

Each indicator element 110 may have an associated graphic indicator and lighted element (e.g., a visible LED). Each graphic indicator may provide a user with information regarding the purpose of the indicator element (e.g., device power, battery status, wireless connection status, etc.). Each lighted element may generate a visible output that provides an indication of the status of the playback element 100. Such visible outputs may include various specific implementations (e.g., a continuous light, a blinking light, etc.). In addition, each visible output may be able to generate different colors (or other appropriate differentiation) that may indicate the status of some element (e.g., a green light when a battery is charging, a red light to indicate the battery charge is low, etc.).

Each speaker 115 may include an exterior waterproof coating (or be composed at least partly using waterproof materials) and be coupled to an enclosure of the playback element 100 using waterproof adhesive and/or other appropriate ways. Similarly, the microphone 120 may include a waterproof coating or materials and may be coupled to the enclosure using waterproof adhesive. Different embodiments may include different arrangements of speakers and/or microphones (e.g., different numbers of components than shown, different orientations than shown, different sizes than shown, etc.).

As shown, the top panel 125 may include a recessed area 130 with a set of single-element controls 135 and a set of dual-element controls 140, and a passive woofer 145 (e.g., an oval port in the top panel with a waterproof membrane stretched across the port). The woofer, speakers 115, and/or microphone 120 may be protected by a water-permeable screen (e.g., a rigid metal panel with multiple holes that allow sound to pass through the screen and protects the components from external objects that may otherwise damage any fragile membranes associated with the various speakers, woofers, and/or microphones). The recessed area 130 may be sized such that the control elements 135-140 may not extend past the face of the top panel 125. In this way, control elements such as buttons may be less prone to be accidentally activated during use (or storage, transportation, etc.).

Each single-element control 135 may allow a user to control various functionality of the playback element 100 (e.g., power, activate wireless communication, activate speakerphone mode, etc.). In some embodiments, each single-element control 135 may control multiple functions (e.g., a wireless control button may be depressed and released to activate wireless communication, the same button may be held down for a period of time before being released to activate a "pairing" mode, etc.).

Each dual-element control 140 may control various appropriate functions that may be considered complementary (e.g., volume up/down, previous/next media element, etc.). Different embodiments may include different arrangements of control elements 135-140 (e.g., additional elements, fewer elements, elements arranged in different layouts, etc.).

As shown, the rear panel 150 may include a recessed area 155 with a set of connection ports 160-165 and an attachment element 170. The recessed area 155 may include a cover (not shown) that is able to provide a waterproof seal around the recessed area such that the connection ports 160-165 (and/or other appropriate elements) and not exposed to water, dust, etc. when the cover is secured.

In this example, a first connection port 160 may be adapted to receive an audio input (and/or provide an audio output).

The first connection port 160 may allow a user to connect, for instance, a user device output (e.g., audio out, headphone out, etc.) to the playback element 100 in order to use the playback element to generate an audible output based at least partly on audio signals received through the connection port 160. The first connection port may allow a user to connect an element such as a musical instrument or microphone such that the sound may be amplified and delivered by the playback element 100. Different embodiments may have different specific connection ports having different sizes, shapes, etc., as appropriate.

The second connection port 165 may be adapted to allow a charging element or mobile device to be coupled to the playback element 100. For instance, in some embodiments the second connection port 165 may be a USB connector that is able to receive a power supply for charging an internal battery of the playback element 100 and/or to communicate with a mobile device (e.g., a smartphone, tablet, etc.) to receive media for playback, deliver audio data generated using the microphone, receive configuration data, etc.

The attachment element 170 of this example may include a receptacle for a strap (or other appropriate element) and be fastened to the enclosure in such a way (e.g., using a pivoting element) that the strap is able to be moved in various ways relative to the enclosure. In this way, a user may be able to attach a strap and/or clip to the playback element 100 such that the element may be attached to various things (e.g., a backpack, cooler, beach chair, etc.) for convenient use, transportation, and/or storage. Different embodiments may include different specific types, numbers, and/or configurations of attachment elements.

During operation, an internal battery of the playback element 100 may be charged by connecting a power source to a connection port (e.g., port 165). The playback element 100 may then be activated using a power button 135. A media source such as a smartphone may then be connected, either by connecting a cable from the source to a connection port (e.g., port 160) or establishing a wireless link (e.g., using a Bluetooth button 135). Such a wireless connection may allow the element 100 to maintain a waterproof state (e.g., by allowing any external flaps to be closed).

The media source may provide data across the link (e.g., audio data associated with an mp3 player application of a smartphone) which may be converted into an audio output and provided by the element 100 through the speakers 115, woofer 145, and/or connection port (e.g., port 160). Playback may then be controlled using the UI elements 135-140 and/or elements provided by the media source.

In addition, the element 100 may be used as a speakerphone element, for example by pressing a button 135 that causes media playback to cease and instead receives inputs through, for example, microphone 120 and converts and sends data associated with the inputs to a mobile device that, in turn, sends data that is received by the element 100 and provided to one or more appropriate outputs (e.g., speakers, audio output, etc.).

Although the playback element 100 has been described with reference to particular features and components, one of ordinary skill in the art will recognize that the playback element may be implemented in various different ways without departing from the spirit of the invention. For instance, different embodiments may include different numbers, types, and/or arrangements of control elements such as buttons. As another example, different embodiments may include different arrangements of indication elements, speakers, connection ports, etc., than those shown.

B. Hardware Architecture

Figure 2:
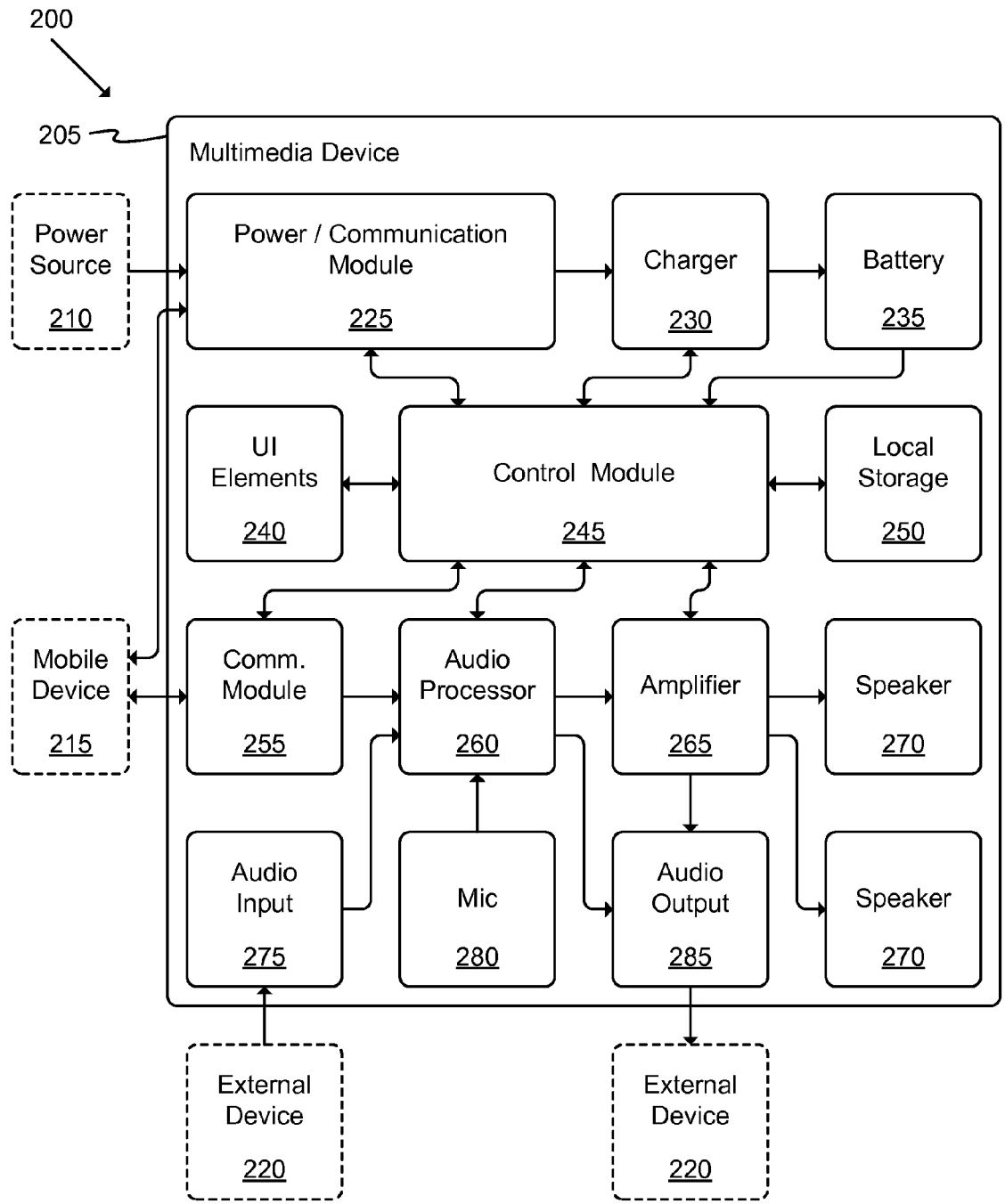
FIG. 2 illustrates a schematic block diagram of a hardware system included with some embodiments of the playback element of FIG. 1.

FIG. 2 illustrates a schematic block diagram of a hardware system 100 included with some embodiments of the playback element of FIG. 1. Specifically, FIG. 2 shows various components of the playback element and their interactions with external devices.

As shown, system 200 may include a multimedia device 205, a power source 210, a mobile device 215, and a set of external devices 220. The multimedia device 205 may be a device such as playback element 100 described above. Power source 210 may be any source capable of providing power and connecting to the multimedia device (e.g., an AC power source, a USB connection to a powered device such as a PC, an external battery, a solar cell, etc.). The mobile device 215 may be any device that is capable of communicating with the multimedia device (e.g., a smartphone, tablet, mp3 player, DVD or blu-ray player, etc.). Such communication may be wired and/or wireless, as appropriate. The external devices 220 may be external input sources (e.g., external microphones, instruments, mixers, etc.), external output sources (e.g., external speakers, recording devices, etc.), and/or an input/output source (e.g., a PC or mobile device, a headset with microphone, etc.).

Multimedia device 205 may include a power and/or communications module 225, a charger 230, a battery 235, a set of UI elements 240, a control module 245, local storage 250, a communication module 255, an audio processor 260, an amplifier 265, a set of speakers 270, a set of audio inputs 275, a microphone 280, and a set of audio output 285.

Power and/or communications module 225 may be provided via a physical port (e.g., a USB port or other appropriate cable connector). Such a module may be able to receive power and/or data through the physical port and communicate with other system elements. In addition, the module may output power and/or data through the physical port. In some embodiments, the device 205 may be able to be operated using a power source provided through the module 225.

Charger 230 may receive power from the power input 225 and provide charging power to the battery 235, as appropriate. In addition, some embodiments may allow the charger 230 to receive battery power and provide the power to an external device connected to the power input 225. Rechargeable battery 235 may include one or more physical elements capable of storing power. The device 205 may be operated using power stored by the battery 235 and provided to the other elements of multimedia device 205 (e.g., via a power bus).

UI elements 240 may include various elements for receiving inputs from a user (e.g., buttons, switches, touchscreens, etc.) and various elements for providing outputs to a user (e.g., indicator LEDs, touchscreens, display elements, etc.). In some embodiments, various UI elements may be provided by an external device. For instance, a smartphone may be used to provide control inputs to the multimedia device and/or display outputs from the device.

Control module 245 may interact with various other modules to control operations, communications pathways, etc. The control module may include various physical elements (e.g., switches, logic elements, programmable ICs, processors, etc.) and/or virtual elements (e.g., software modules, interfaces, etc.). The control module 245 may receive and evaluate inputs (e.g., inputs received via the UI elements 240) and generate appropriate outputs that are able to at least partially control functionality of the other modules of device 205. Local storage 250 may be able to store data and/or instructions for use by the control module 245 (and/or other elements of multimedia device 205). Such data may include, for example, user preferences, default values, operating algorithms, media content, etc.

The communication module 255 may be adapted to communicate with various external elements (e.g., a mobile device such as a smartphone) using various appropriate pathways (e.g., a wired connection, a Bluetooth connection, a Wi-Fi connection, etc.). The communication module may be at least partially controlled using a UI element 240 (e.g., a button) and/or the control module 245 (which may include commands received from an external device).

The audio processor 260 may be adapted to receive inputs from the audio inputs 275, the communication module 255, the control module 245, the microphone 280 and/or other elements and generate an appropriate output signal to send to the amplifier 265, audio output 285, and/or other appropriate elements. The audio processor 260 may be able to send and/or receive analog and/or digital signals, as appropriate.

The amplifier 265 may include various components capable of receiving an audio signal and generating an output that is able to drive one or more speakers 270. Such an amplifier 265 may also be able to generate an output that is able to drive one or more audio outputs 285. Each speaker 270 may be able to receive an audio signal and convert the signal to audible sound.

Each audio input 275 may include an input port or other appropriate connection and be able to receive inputs from an external device 220 and pass the input to the audio processor 260. Each microphone 280 may be adapted to capture audible sounds and generate an appropriate output to send to the audio processor 260. In some embodiments, the microphone 280 may automatically convert the received sounds to a set of digital signals.

Each audio output 285 may include an output port or other appropriate connection and be able to generate outputs and pass the outputs to various external devices 220. Such outputs may be formatted in various appropriate ways, depending on the type of external device. In some embodiments, at least one audio input 275 and at least one audio output 285 may share a single connection port.

Different embodiments may include other different features, such as one or more video display elements (e.g., LCD panels, LED screens, touchscreens, etc.) and/or video input elements (e.g., a camera). In addition, some embodiments may include processing elements such as video and/or audio encoders and/or decoders. Such encoders and/or decoders may be implemented using different combinations of hardware, as appropriate.

During a typical operation scenario, a mobile device 215 may provide streaming audio content to the communication module 255 over a wireless channel (e.g., Bluetooth). The audio content may be delivered to the audio processor 260 which, in turn, provides an audio output to the amplifier 265 and the speakers 270. The content delivery (e.g., volume, type of content, etc.) may be controlled based on inputs received from UI elements 240 (and/or other appropriate elements) and interpreted by the control module 245.

In another typical operation scenario, a mobile device 215 may be coupled to the multimedia device 205 such that the multimedia device may be used as a speakerphone. The multimedia device may be able to receive inputs from the microphone 280, convert the inputs using the audio processor 260 and/or control module 245, and send the converted inputs to the mobile device 215. The mobile device may then send the received inputs to another party. The mobile device may further receive communications from the other party and relay the communications to the multimedia device 205 which may, in turn, process the received information using the communication module 255, audio processor 260, amplifier 265, and delivering the communications to a user through the speaker(s) 270.

If a power source 210 is connected, the device may be at least partially powered from the source and the battery 235 may be charged via the charger 230 and power input 225. Alternatively, if no power source 210 is connected, the device may operate on power provided by the battery 235.

One of ordinary skill in the art will recognize that the system 200 and multimedia device 205 are conceptual in nature and may be implemented in various different ways without departing from the spirit of the invention. For instance, some embodiments may include different modules than those shown (e.g., additional modules, fewer modules, combined modules, divided modules, etc.). As another example, different embodiments may include various different communication pathways than shown. As still another example, different embodiments may include different numbers of inputs, outputs, ports, etc. than shown.

C. Software Architecture

Figure 3:
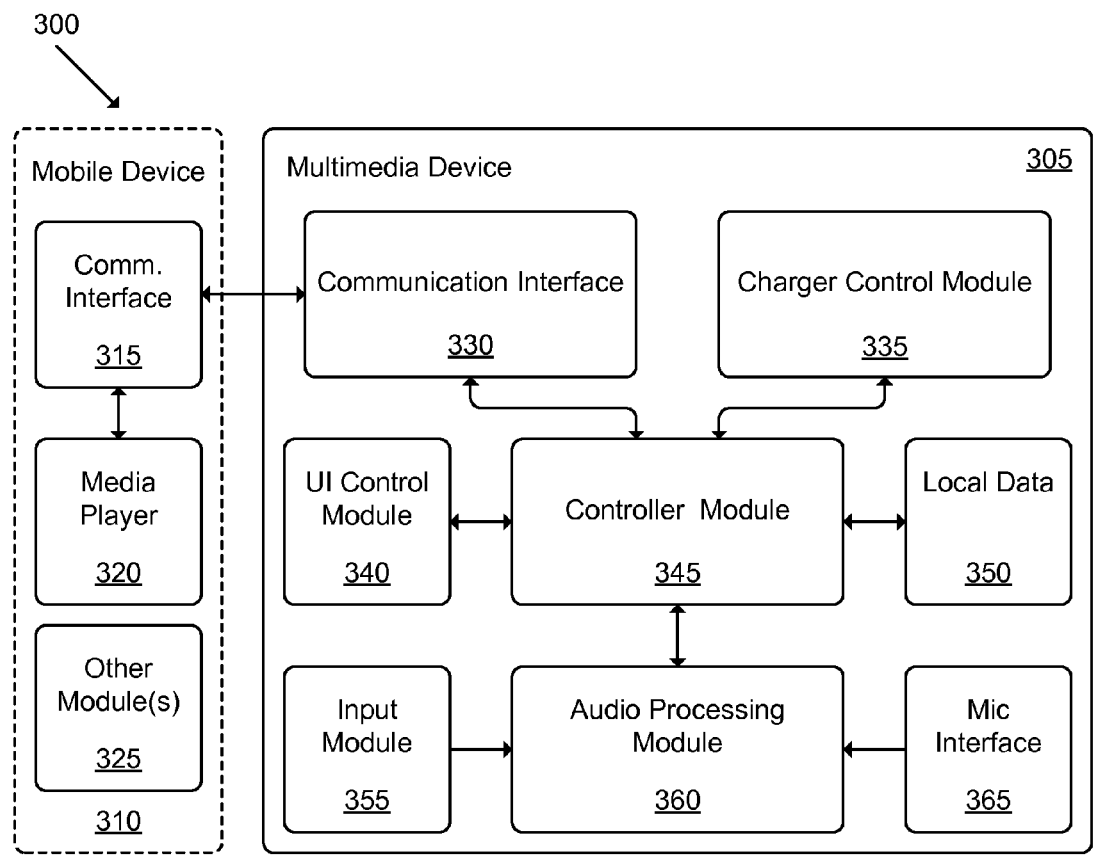
FIG. 3 illustrates a schematic block diagram of a software system included with some embodiments the playback element of FIG. 1.

FIG. 3 illustrates a schematic block diagram of a software system 300 included with some embodiments the playback element 100. This figure highlights several components that may be included in some embodiments. Although described by reference to a software system 300, one of ordinary skill in the art will recognize that such a system may be implemented using various combinations of hardware and software elements. Some such systems may be implemented completely using hardware elements that do not execute software instructions.

As shown, the system 300 may include a multimedia device 305 (e.g., playback device 100, multimedia device 205 and/or other appropriate devices) and a mobile device 305 (e.g., mobile device 215). Some embodiments may include other elements (e.g., external devices, additional mobile devices, etc.) that may also interact with the software system 300.

The mobile device 305 may include a communication interface 315, a media player 320, and/or other modules 325. The communication interface 315 may allow the mobile device 310 to communicate with the multimedia device 305 (e.g., via a cable connection, via a Bluetooth or other wireless connection, etc.). In some embodiments, the communication interface 315 may simply include a physical connection (e.g., a jack that allows for a cable to connect the devices).

The media player 320 may be able to access multimedia content (e.g., from a local storage of the mobile device 310, via a network connection, etc.) and generate output data associated with the media content. In addition, the media player 320 may be able to receive (e.g., via the communication interface 315, from a user interface of the mobile device 310, etc.) commands that may at least partially control operation of the media player 320 (e.g., pause, play, next, etc.).

The other modules 325 may be adapted to provide various other features. Such features may include, for instance, UI features, local storage access, remote storage access, and/or multimedia playback and/or display.

Multimedia device 305 may include a communication interface 330, a charger control module 335, a UI control module 340, a controller module 345, local data 350, an input module 355, an audio processing module 360, and a microphone interface 365.

The communication interface 330 may allow the various modules of the multimedia device 305 to communicate with the mobile device 310 (e.g., via a cable connection, via a Bluetooth or other wireless connection, etc.). Some embodiments may include multiple communication interfaces 330, such that a first connection may be made with a first device, a second connection with a second device, etc. In addition, multiple types of communication interfaces 330 may be included in a single multimedia device 305 (e.g., a wired interface such as a USB connector, a wireless interface such as Bluetooth, etc.).

The charger control module 335 may manage the charging of a rechargeable battery included in some embodiments. The module may be able to receive power from various sources (e.g., a connection to an external source, an internal source such as a solar cell, etc.). The charger module may be able to communicate with the controller module 345 and/or be able to determine a current battery charge level. In this way, the charger module 335 may be able to control the amount of available power used to charge the battery. In some embodiments, the charger control module may be able to receive power from the internal battery and provide charging power to an external source (e.g., a mobile device such as a smartphone).

The UI control module 340 may allow the multimedia device 305 to receive user inputs and provide outputs to the user. For instance, the UI control module 340 may receive signals associated with various physical buttons on the multimedia device 305. In addition, the UI control module 340 may provide various visual indications (e.g., using LEDs of various colors, using a touchscreen of a mobile device, etc.). Such a UI control module 340 may be able to receive data from various types and quantities of inputs and provide data to various types and quantities of outputs.

The controller module 345 may be able to communicate among the various other modules, execute various logical operations and/or instructions, and/or access local data 350. Local data may include data such as user settings, paired device information, media content, etc.

The input module 355 may include various interfaces and/or conversions that may allow the multimedia device 305 to receive inputs from external sources (e.g., audio devices, cameras, microphones, etc.). The audio processing module 360 may include various elements that are able to receive signals from the inputs module(s), microphone interfaces 365, and/or other appropriate elements and generate outputs that are able to be sent to an external device (e.g., mobile device 310) or otherwise used by the multimedia device 305 (e.g., for voice-control functionality related to the multimedia device UI). The microphone interface 365 may include various elements that able to receive signals from a microphone and generate appropriate outputs for use by the audio processing module 360 and/or other appropriate modules.

During operation, a communication link may be established between the mobile device 310 and multimedia device 305 through the communication interfaces 315 and 330. Media content may be provided form the media player 320 and/or other modules 325 and sent to the multimedia device over the link. The data received by the multimedia device 305 may be passed through the controller 345 to the audio processing module 360 and output by the device (e.g., using a set of speakers associated with the audio processing module).

The UI control module 340 may continuously determine whether any inputs have been received. Such received inputs may be passed to the controller 345 which may, in turn, perform a set of operations based on the received inputs. For instance, an input such as a button press may be associated with increasing volume through the audio processing module 360. Pressing a different button may cause the multimedia device 305 to enter a speakerphone mode when connected to an appropriate mobile device 310 (e.g., a smartphone or other cellular communication device). In addition, the UI control module 340 may receive inputs that are passed through the controller 345 and interface 330 to the mobile device 310, where the data received by the mobile device may cause the mobile device to perform various appropriate operations (e.g., at least partially controlling the operation of the media player 320, causing the device 310 to end a call, etc.).

During speakerphone operation, the multimedia device 305 may act as an external microphone and speakers for the mobile device 310. Audio inputs may be received through the microphone interface 365, processed, and passed to the mobile device 310 over the link, such that the mobile device may transmit the received audio to another party to the call. Likewise, audio that would normally be provided through an internal speaker or headset of the mobile device may instead be passed to the multimedia device 305 over the link, processed, and output through a set of speakers included in the multimedia device.

One of ordinary skill in the art will recognize that the system 300 and multimedia device 305 are conceptual in nature and may be implemented in various different ways without departing from the spirit of the invention. For instance, some embodiments may include different modules than those shown (e.g., additional modules, fewer modules, combined modules, divided modules, etc.). As another example, different embodiments may include various different communication pathways than shown. As still another example, different embodiments may include different numbers of interfaces, inputs, outputs, etc. than shown.

II. Enclosure

Sub-section II.A provides a conceptual description of various waterproof features of some embodiments. Sub-section II.B then describes shock-resistant features of some embodiments. Next, sub-section II.C describes mounting features of some embodiments. Lastly, sub-section MD describes verification testing performed on some embodiments.

A. Waterproof Features

Figure 4A:
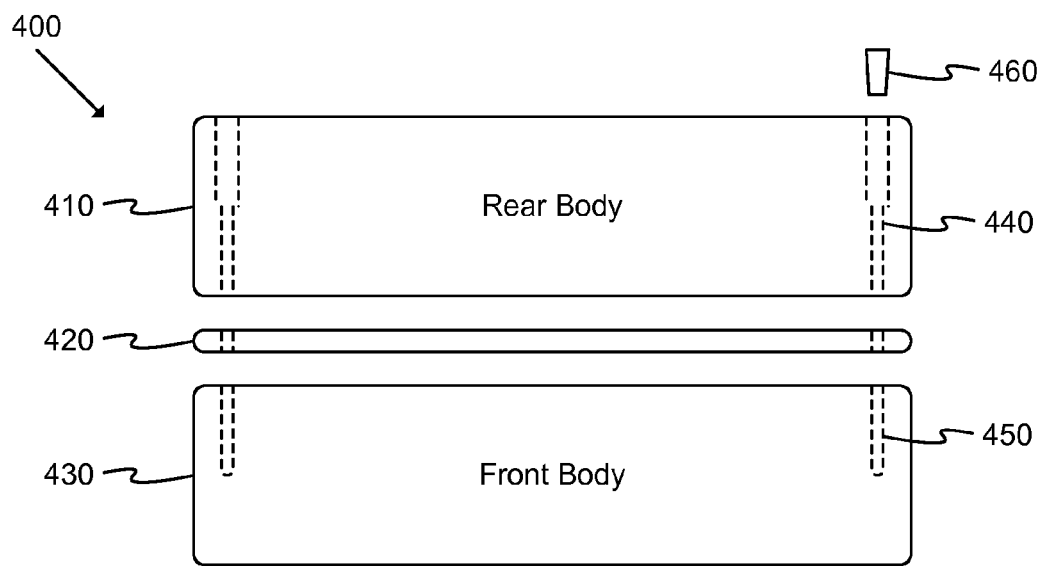
FIG. 4A conceptually illustrates an exploded top view of a waterproof case of some embodiments.
Figure 4B:
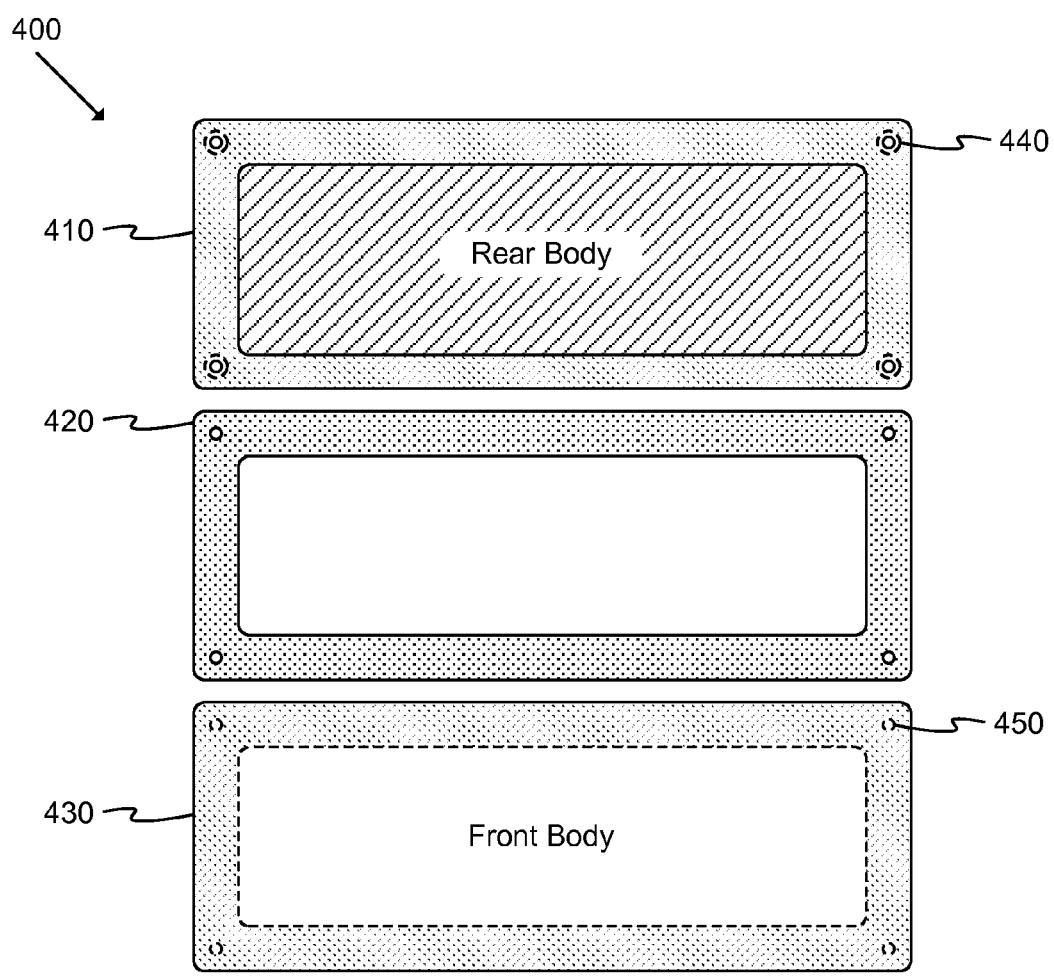
FIG. 4B conceptually illustrates a front view of the components of the waterproof case of FIG. 4A.

FIG. 4A conceptually illustrates an exploded top view of a waterproof case 400 of some embodiments. FIG. 4B conceptually illustrates a front view of the components of the waterproof case 400. Specifically, these figures highlight various components that may be used to create a waterproof enclosure. As shown, the case may include a rear body portion 410, a gasket 420, a front body portion 430, a set of fastener channels 440, a set of fastener receptacles 450, and a set of stoppers 460.

The rear body portion 410 may be constructed of appropriate combinations of materials (e.g., plastic, rubber, metal, etc.) and may include the set of fastener channels 440. Each fastener channel may allow a fastener such as a screw to pass through the channel. The channel may be of varying diameters, as shown, such that a screw head may be restrained at a point along the channel, while the body of the screw may be able to pass the point.

The front body portion 430 may be constructed of appropriate combinations of materials (e.g., plastic, rubber, metal, etc.) and may include the fastener receptacles 450. Each fastener receptacle may be sized and/or shaped such that a fastener such as a screw is able to pass through at least a portion of the first fastener channel 440 and be secured into at least a portion of the receptacle 450 such that the front body portion 430 and rear body portion 410 are drawn together (along contacting regions of the portions, as shown in FIG. 4B), compressing the gasket 420 between the body portions 410 and 430.

The connection features formed by the fastener channels 440 and the receptacles 450 may be spaced in various appropriate ways around the contacting regions of the body portions 410 and 430. Different embodiments may include different numbers, sizes, shapes, etc. of connection features, as appropriate.

Gasket 420 may be made of various appropriate materials (e.g., rubber, silicon, etc.) and may be pre-formed such that a complete gasket is aligned between the body portions prior to connecting the portions or may be applied to one or more body portions along the contacting regions (e.g., as a waterproof adhesive).

Stopper 460 may be sized such that the stopper may be inserted into at least a portion of the fastener channel 440 such that a waterproof seal is formed. Such a stopper 460 may be made of various appropriate materials (e.g., rubber, silicon, etc.) and may be shaped appropriately (and/or compressed prior to placement) such that the stopper may form a seal with the wall of the channel 440 (e.g., by having a tapered shape).

During assembly (after placing any internal components such as electronics and/or external components such as UI elements), the body sections 410 and 430 may be aligned and the gasket 420 may be aligned or applied, as appropriate. The various fasteners may be used to attach the front and rear sections 410 and 430 such that sufficient force is applied to generate a waterproof seal in conjunction with the gasket 420. The outer opening of the first channels 440 may then be sealed by placing a stopper 460 at least partially inside each channel such that a waterproof seal is formed along an outer edge of the stopper and an outer edge of the opening of the channel 440.

One of ordinary skill in the art will recognize that the case (or housing) of FIGS. 4A-4B is conceptual in nature and may be implemented in various specific ways without departing from the spirit of the invention. For instance, although the front and rear body sections are shown as being approximately the same size, different embodiments may size the portions in various ways (e.g., a rear body section may form the majority of the enclosure while the front body section may be a thin faceplate). In addition, the housing may include multiple layers (e.g., a structural inner layer made of metal and/or plastic, an outer layer made of rubber of an appropriate thickness to provide waterproof and shock-absorbent features of some embodiments, etc.).

Figure 5A:
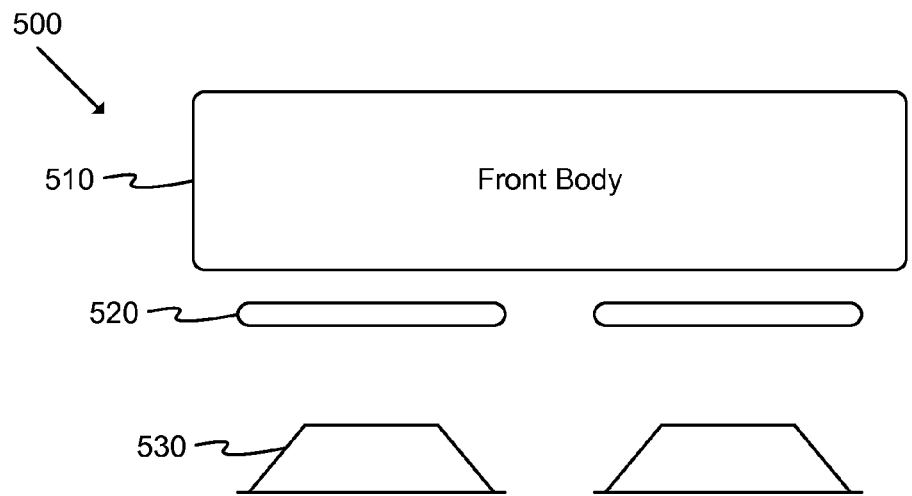
FIG. 5A conceptually illustrates an exploded top view of a front body section of some embodiments.
Figure 5B:
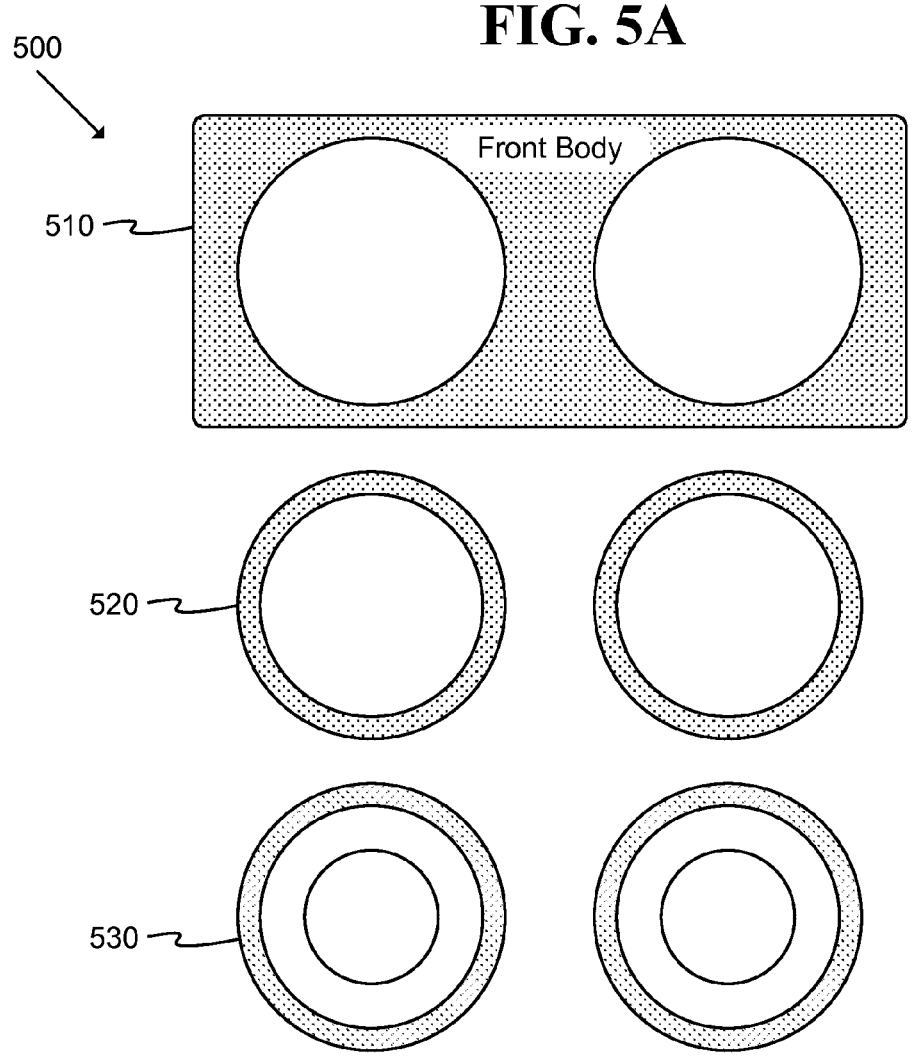
FIG. 5B conceptually illustrates a top view of the components of the front body section of FIG. 5A.

FIG. 5A conceptually illustrates an exploded top view of a front body section 500 of some embodiments. FIG. 5B conceptually illustrates a top view of the components of the front body section 500. Specifically, these figures highlight various components that may be used to create a waterproof enclosure. As shown, the front section may include an enclosure 510, a set of gaskets 520, and a set of speakers 530. In addition, such a front section may include a set of microphones and appropriate sealing features (not shown) and/or other waterproof elements such as LED outputs, buttons or controls, etc. (not shown).

Each speaker 530 may be attached to the enclosure 510 through an appropriately-sized port using a gasket 520. In some embodiments, each gasket may be applied to portions of the body 510 and/or speaker 530 as a waterproof adhesive layer (e.g., a liquid, gel, paste, tape, and/or other appropriate form of adhesive) at the time of assembly. Alternatively, each gasket 520 may be pre-formed element (e.g., a rubber gasket). Each speaker 530 may include a waterproof damper (e.g., a damper coated with rubber of an appropriate thickness such as 0.18 mm).

Any other elements of the front section 500 may be attached and/or sealed as appropriate. For instance, a set of UI elements may be attached to a printed circuit board (PCB) and/or other appropriate element that is then attached to the front section. Such UI elements (e.g., buttons, lights, etc.) may then be externally sealed, as appropriate (e.g., buttons may be covered by a layer of rubber, LEDs may be adhered to the enclosure using waterproof adhesives, etc.).

One of ordinary skill in the art will recognize that the case (or housing) of FIGS. 5A-5B is conceptual in nature and may be implemented in various specific ways without departing from the spirit of the invention. For instance, different embodiments may include various different elements than shown. As another example, different embodiments may be shaped and/or sized in various different ways. As still another example, different embodiments may attach components in various different ways (e.g., speakers may be attached to an external surface of a front face of the enclosure and/or to an internal surface of the front face of the enclosure).

Figure 6A:
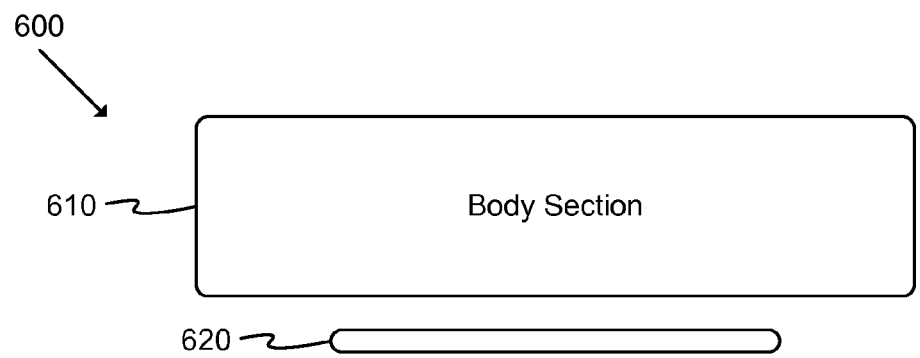
FIG. 6A conceptually illustrates a top view of a body section with a waterproof access element of some embodiments.
Figure 6B:
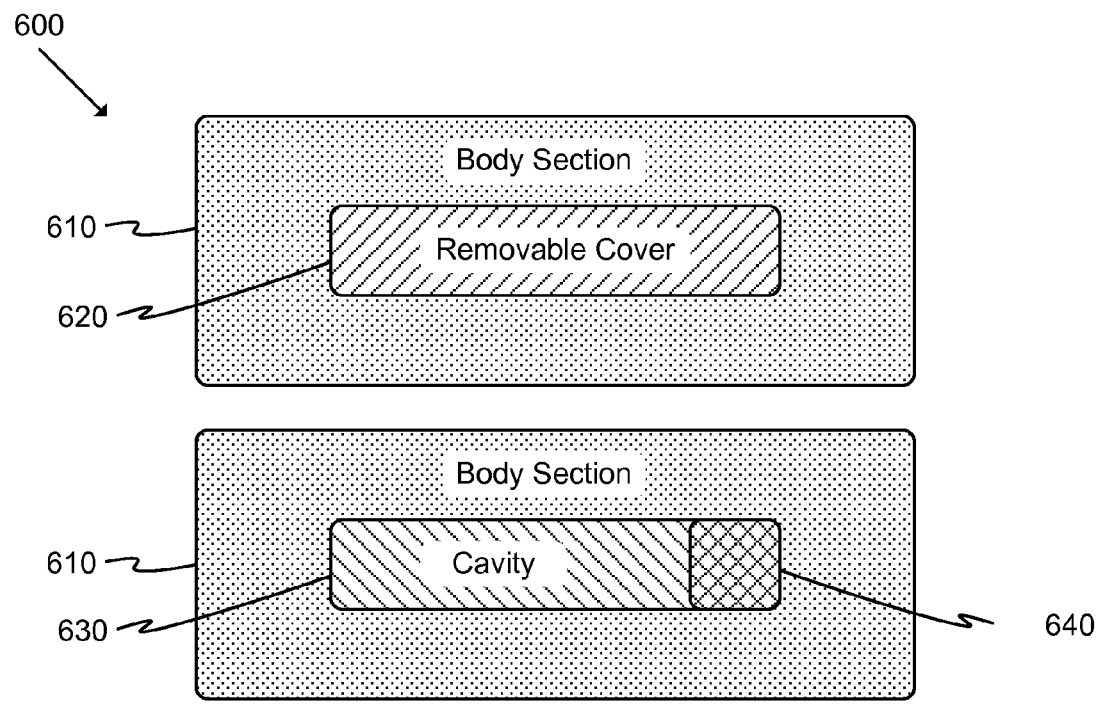
FIG. 6B conceptually illustrates a rear view of a body section with the waterproof access element of FIG. 6A.

FIG. 6A conceptually illustrates a top view of a body section 600 with a waterproof access element of some embodiments. FIG. 6B conceptually illustrates a rear view of the body section 600. Specifically, these figures highlight various components that may be used to create a waterproof enclosure. As shown, the rear section 600 may include an enclosure 610 and a removable (or partly-removable) access cover 620.

The removable cover of some embodiments may be made of flexible, waterproof materials (e.g., rubber, silicon, etc.), and may include an attachment feature (e.g., an extending prong, a flap, etc.) that may be able to be attached to the enclosure 610 in such a way (e.g., using adhesive, using compression elements, etc.) that a waterproof seal is formed when the removable cover 620 is in a "closed" position. In some embodiments, the entire cover may be removed from the enclosure when in an "open" position. Alternatively, only a portion of the cover may be removed while a portion (e.g., the attachment feature) remains attached to the enclosure. The removable cover may be associated with a cavity 630 and attachment region 640.

The cavity 630 may defined an area that has waterproof protection when the removable cover 620 is in a closed position and that is accessible when the removable cover 620 is in an open position. The cavity may include various connectors (e.g., USB ports, microphone/headphone connectors, etc.) that may be used to couple a multimedia device of some embodiments to various external elements (e.g., a mobile device, a charging source, etc.).

In some embodiments, the cavity 630 may include a double-wall design (not shown) such that a portion of the cover 620 extends between the walls to form a seal around the cavity.

The attachment region 640 may include an area to apply adhesive, a receptacle, compression fitting or other appropriate attachment element, and/or other appropriate features that may allow at least a portion of the removable cover 620 to be attached to the enclosure 610. Any remaining portion of the cover 620 may then be free to engage with the cavity 630 to form a waterproof seal, or disengage to allow access to the cavity 630.

During operation, the removable cover 620 may be kept in a closed position to achieve a waterproof enclosure. If a user desires to connect the multimedia device using a physical connection such as a cable (e.g., to a mobile device, to a charging source, etc.), the user may pull a tab (not shown) of the cover to release a portion of the cover from the cavity 630. After disconnecting the device the user may close the cover 620 by pressing the portion of the cover into the cavity 630.

One of ordinary skill in the art will recognize that the case (or housing) of FIGS. 6A-6B is conceptual in nature and may be implemented in various specific ways without departing from the spirit of the invention. For instance, the access cover of some embodiments may be shaped or sized in various different ways. As another example, the access cover may be attached to the enclosure in various appropriate ways (e.g., adhesive, fasteners, etc.) and/or formed integrally with the enclosure.

B. Shock Resistant Features

Figure 7A:
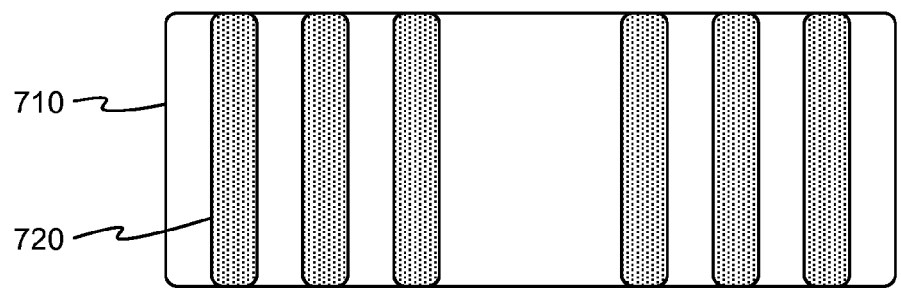
FIG. 7A conceptually illustrates a top view of shock resistant features of some embodiments.

FIG. 7A conceptually illustrates a top view of an enclosure 710 with shock resistant features 720 of some embodiments. Specifically, this figure shows various external "ribs" 720 that may be spaced along an exterior surface of the enclosure to provide shock resistance. Such ribs may be formed by including various protuberances (e.g., sections of thick rubber ribs) along the exterior of the enclosure 710.

Figure 7B:
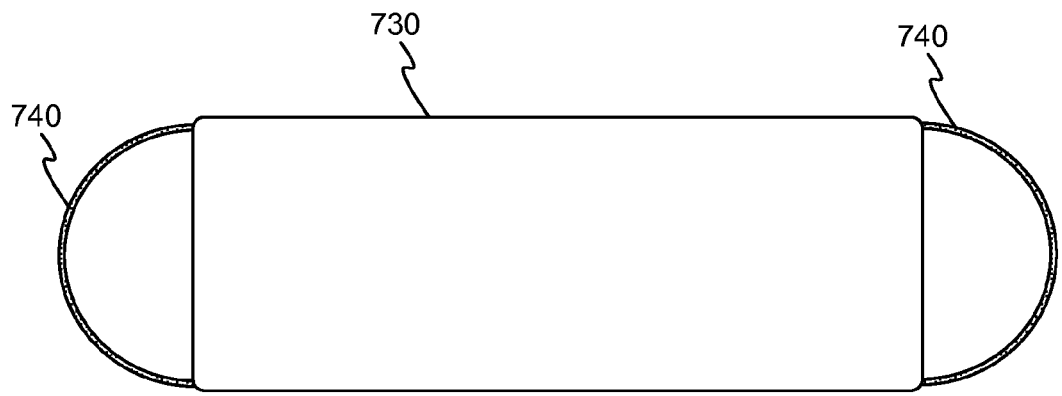
FIG. 7B conceptually illustrates a front view of shock resistant features of some embodiments.

FIG. 7B conceptually illustrates a front view of an enclosure 730 with shock resistant features 740 of some embodiments. Specifically, this figures shows rounded handles 740 that may be utilized to grasp, hold, and/or transport the enclosure 730. In addition, such handles may provide shock absorbing properties (e.g., by sizing the handles with an appropriate thickness such that the handles are able to flex and absorb impact forces applied to the handles).

In some embodiments, the housing may include a polycarbonate (PC) inner shell with thermoplastic elastomer (TPE) covering an exterior surface of the housing. The inner shell may have a minimum thickness (e.g., 1.9 mm, 2.2 mm, etc.). In addition, the TPE covering may have a minimum thickness (e.g., 2.0 mm).

Some embodiments may include speaker mounts (not shown) that are specifically adapted to be fastened to the inside of the device front panel to support the weight of the speaker magnets during a shock event.

One of ordinary skill in the art will recognize that the shock absorbing features of FIGS. 7A-7B are conceptual in nature and may be implemented in various specific ways without departing from the spirit of the invention. For instance, although some embodiments may include ribs and handles. As another example, different embodiments may include different numbers, sizes, shapes, etc. of handles and/or ribs.

C. Mounting Features

Figure 8:
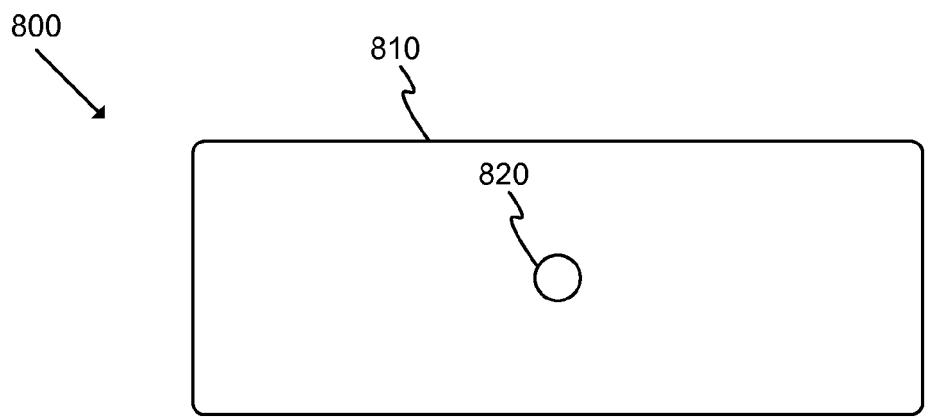
FIG. 8 illustrates a bottom view of an enclosure with a mounting feature of some embodiments.

FIG. 8 illustrates a bottom view of an enclosure 810 with a mounting feature 820 of some embodiments. In this example, the mounting feature may be a flat-bottomed screw hole (e.g., for attaching to a standard tripod mount) or other appropriate mounting feature that may allow the enclosure 810 to be securely fastened to an external element such as a floor stand, wall mount, etc.

One of ordinary skill in the art will recognize that different embodiments may include various different types, numbers, sizes, and/or other variations of mounting features, as appropriate (e.g., screw-on fittings, compression fittings, etc.). In addition, the mounting (or fastening) features may be place at various appropriate locations along the exterior surface of the enclosure of some embodiments.

D. Verification Testing

Figure 9:
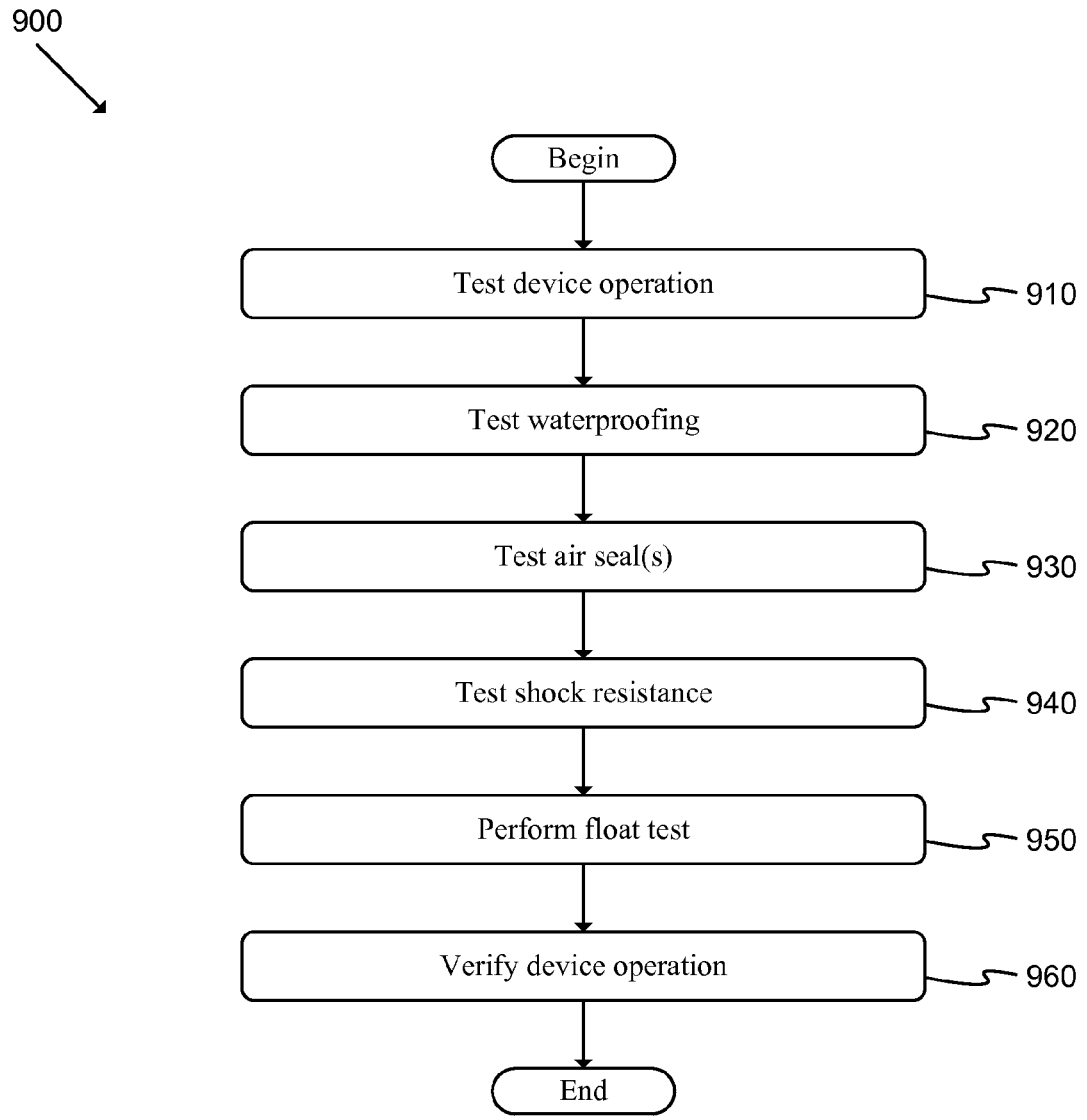
FIG. 9 illustrates a flow chart of a verification process performed in some embodiments.

FIG. 9 illustrates a flow chart of a verification process 900 performed in some embodiments. Such a process may be performed, for instance, after a multimedia device (e.g., device 100) has been assembled. In some embodiments, the verification may be performed using a completely assembled unit. In other embodiments, elements and/or sets of elements may be tested whether assembled into a complete unit or not. In some embodiments, each completely assembled unit may be testing using a process such as process 900.

As shown, the process may test (at 910) device operation. Such testing may involve subjecting the device to various set of inputs (e.g., audio inputs, control inputs, etc.), measuring various sets of outputs (e.g., audio outputs, response to control inputs, etc.), and comparing the measured values to a set of test criteria (e.g., lower and upper thresholds for various parameters).

Next, the process may test (at 920) waterproofing. Such testing may include subjecting the device under test (DUT) to various conditions (e.g., being placed one meter underwater for thirty minutes, being placed 0.3 meters underwater for twelve hours, etc.). Such conditions may be specified by various appropriate bodies. Each DUT may include various sets of components included in some embodiments, and may include all elements in a completely assembled device.

The process may then test (at 930) air seals of the enclosure. Such testing may include applying pressure (e.g., ten kilopascals) for a set of durations (e.g., thirty seconds each) while the enclosure is connected to an air pressure measuring element that is able to identify any air leaks in each section of the enclosure. For instance, each body section may be aligned with a test jig that includes an appropriately sized receptacle for the section under test (and/or appropriate gaskets, etc.).

Process 900 may then test (at 940) shock resistance of the enclosure (and/or portions of the enclosure). For instance the DUT may be dropped from a particular height a specified number of times, compressed under a load, etc.

Next, the process may perform (at 950) a float test. Such a test may involve placing the DUT in (at least to a specified depth, such as three-tenths of a meter or one meter) and/or on a body of water and determining whether at least a portion of the DUT remains positioned above the water line when the DUT is released.

Lastly, the process may verify (at 960) operation of the DUT and then may end. Such verification may include various input/output tests (e.g., a data stream may be provided to an input of the device and the resulting output may be measured and compared to various appropriate operational limits).

Depending on the results of the verification performed at 960, each DUT may be deemed acceptable or not acceptable. DUTs that are deemed not acceptable may be excluded from consumer use.

One of ordinary skill in the art will recognize that although process 900 has been described by reference to various details, different embodiments may implement the process in various different ways without departing from the spirit of the invention. For instance, different embodiments may perform the operations in different orders. As another example, various operations may be omitted and/or various other operations may be included. The process may be broken into a set of sub-process and/or be included as a sub-process of a larger macro-process.

III. Methods of Operation

Sub-section III.A describes establishing a communication link among system elements of some embodiments. Sub-section III.B then provides a conceptual description of media playback and control of some embodiments. Lastly, sub-section III.C describes a conceptual process used to provide a speakerphone in some embodiments.

A. Communications

Figure 10:
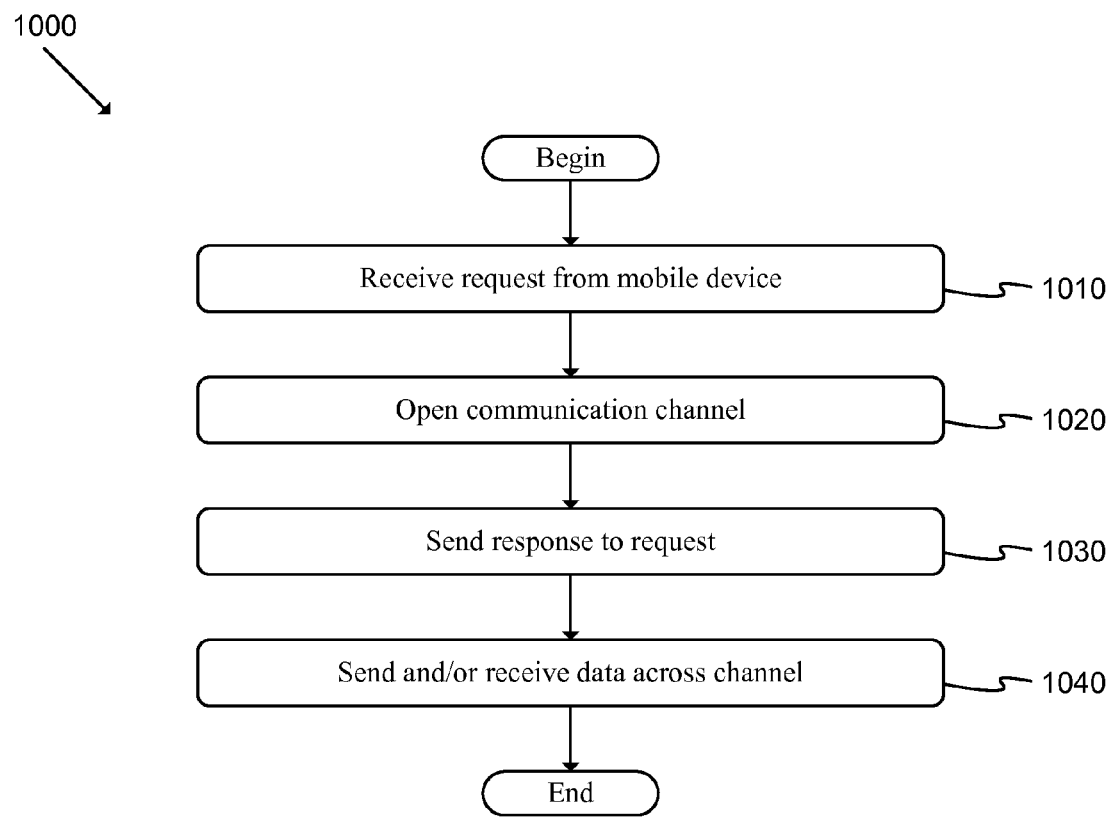
FIG. 10 illustrates a flow chart of a process for establishing communications in some embodiments.

FIG. 10 illustrates a flow chart of a process 1000 for establishing communications in some embodiments. Such a process may be performed by a device such as multimedia device 205 described above, and may specifically use a module such as communication interface 330 described above (and/or other appropriate modules).

The process may begin, for instance, when a user powers on and/or activates a communication link of the multimedia device (e.g., by pressing a button to turn on a Bluetooth element). Next, the process may receive (at 1010) a request from a mobile device (e.g., mobile device 215 described above). Alternatively, the process may provide a signal to the mobile device indicating that the multimedia device is available for pairing.

Next, the process may open (at 1020) a communication channel and send (at 1030) a response to the request from the mobile device. Different embodiments may perform various different specific operations to open the channel (e.g., transferring a set of messages among the devices to be connected, assigning various parameter values, etc.). Such a communication channel may use various protocols, interfaces, and/or other elements, as appropriate.

Process 1000 may then send and/or receive (at 1040) data across the channel and then end. Such data may include, for instance, multimedia data provided by the mobile device to the multimedia device. The data may include, as another example, audio data associated with a phone call being provided by the mobile device to the multimedia device, while the multimedia device may receive audio inputs through a microphone and send audio data associated with the phone call from the multimedia device to the mobile device.

One of ordinary skill in the art will recognize that although process 1000 has been described by reference to various details, different embodiments may implement the process in various different ways without departing from the spirit of the invention. For instance, different embodiments may perform the operations in different orders. As another example, various operations may be omitted and/or various other operations may be included. The process may be executed continuously, at regular intervals, based on some criteria, and/or at other appropriate times. The process may be broken into a set of sub-process and/or be included as a sub-process of a larger macro-process.

B. Media Playback and Control

Figure 11:
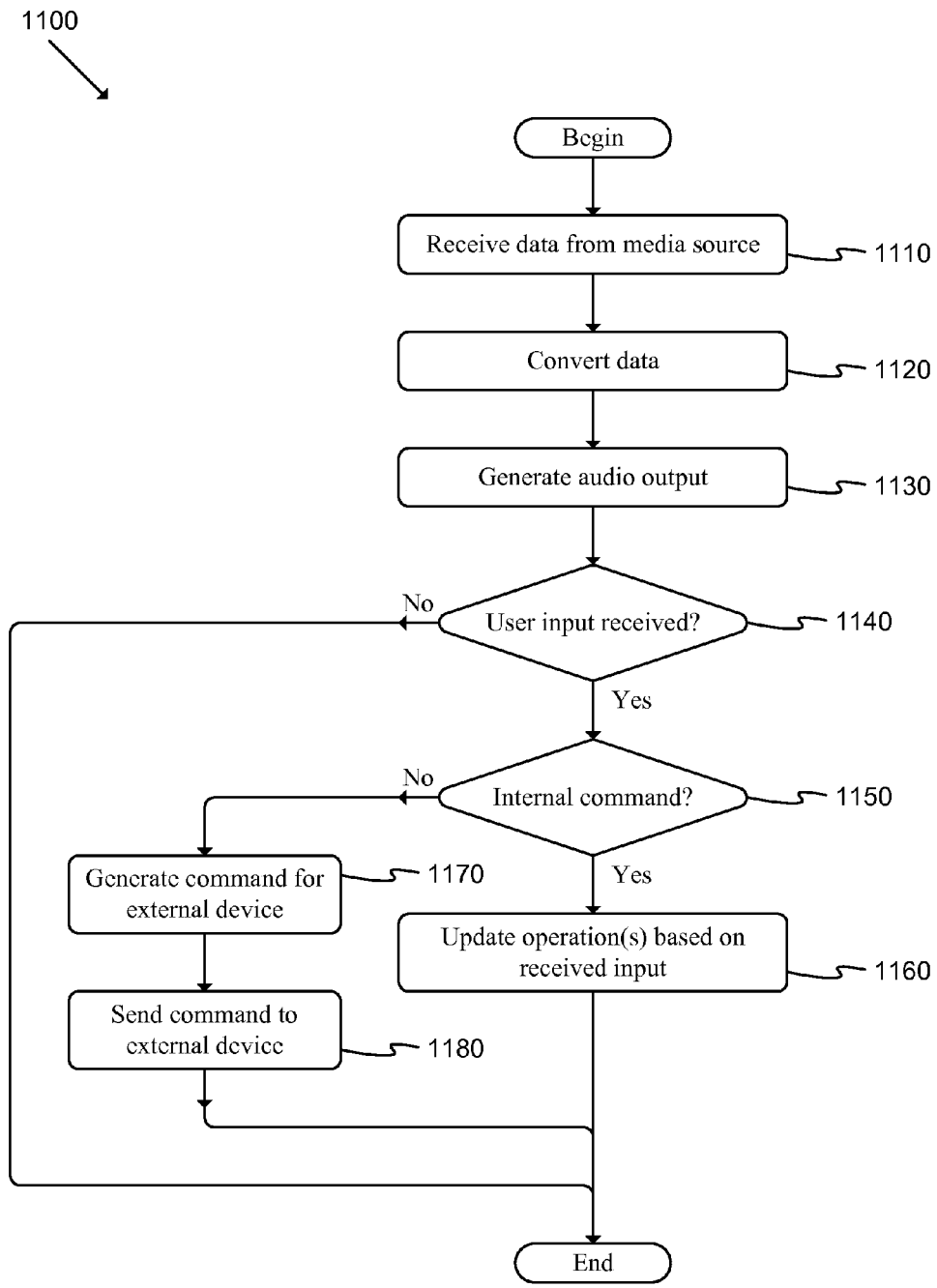
FIG. 11 illustrates a flow chart of a process for receiving, playing, and controlling media in some embodiments.

FIG. 11 illustrates a flow chart of a process 1100 for receiving, playing, and controlling media in some embodiments. Such a process may be performed by a device such as multimedia device 205 described above. The process may begin, for instance, after a communication channel or link has been established (e.g., using process 1000 described above) and a media source (e.g., a device such as mobile device 215 described above) begins providing data over the link.

As shown, the process may receive (at 1110) data from the media source. Such data may be associated with various types of multimedia and/or other data (e.g., audio data, video data, control commands, etc.). Next, the process may convert (at 1120) the received data. Such conversion may include, for instance, generating an analog audio signal output based at least partly on a received bit stream. As another example, conversion may involve decoding a command into a format that may be used to at least partially control the operation of the multimedia device.

The process may then generate (at 1130) an audio output (and/or other types of multimedia outputs). The audio output may be generated, for instance, by providing an audio signal to an audio processor that may perform various operations (e.g., equalization, compression, etc.) to the signal and then send the signal to an audio amplifier such that the audio may be output through a set of speakers (or other appropriate element). Similarly, other types of outputs (e.g., video) may be processed and output through an appropriate element (e.g., a display screen).

Next, the process may determine (at 1140) whether any user input has been received. Such an input may be received through one or more UI elements of the multimedia device, as described above. If the process determines (at 1140) that no user input has been received, the process may end.

If the process determines (at 1140) that a user input has been received, the process may then determine (at 1150) whether the input is associated with an "internal" command. Such an internal command may be any command that directly controls the operation of the multimedia device (e.g., volume, activate wireless channel, etc.). If the process determines (at 1150) that the input is associated with an internal command, the process may update (at 1160) the operation of the multimedia element based at least partly on the received input (e.g., by raising or lowering the volume, by activating wireless communication circuitry, etc.) and then may end.

If the process determines (at 1150) that the command is not internal (i.e., that the command is related to operations of a connected device), the process may generate (at 1170) a command for the external connected device, send (at 1180) the command to the external device and then may end. Such "external" commands may include, for instance, next, previous, etc. and may allow a user to at least partially control multimedia data that is sent to the multimedia device (e.g., by skipping a song in a playlist, by replaying a song, etc.). The external device command may be generated in various appropriate ways and may be formatted appropriate for the device receiving the command. Some embodiments may send such a command over a wireless communication link (e.g., Bluetooth).

Some embodiments may iteratively perform operations 1110-1180 as long as a connection exists between the multimedia device and the mobile device. In some embodiments, various operations may be performed in parallel (e.g., media data may continuously be received and output while also continuously monitoring for user inputs).

One of ordinary skill in the art will recognize that although process 1100 has been described by reference to various details, different embodiments may implement the process in various different ways without departing from the spirit of the invention. For instance, different embodiments may perform the operations in different orders. As another example, various operations may be omitted and/or various other operations may be included. The process may be executed continuously, at regular intervals, based on some criteria, and/or at other appropriate times. The process may be broken into a set of sub-process and/or be included as a sub-process of a larger macro-process.

C. Speakerphone

Figure 12:
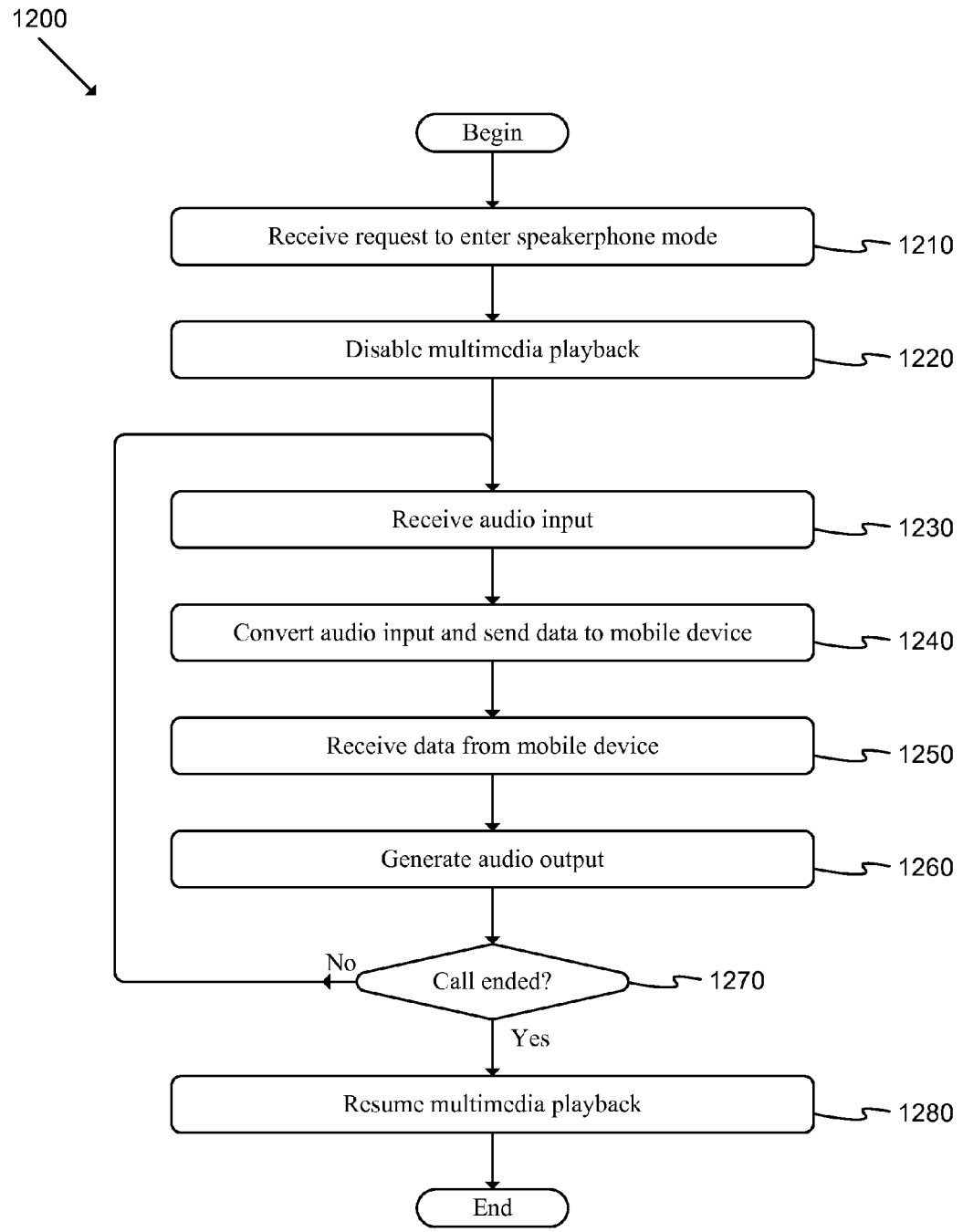
FIG. 12 illustrates a flow chart of a process for implementing a speakerphone feature in some embodiments.

FIG. 12 illustrates a flow chart of a process 1200 for implementing a speakerphone feature in some embodiments. Such a process may be performed by a device such as multimedia device 205 described above. The process may begin, for instance, after a communication channel or link has been established (e.g., using process 1000 described above).

As shown, process 1200 may receive (at 1210) a request to enter speakerphone mode. Such a request may be received in various appropriate ways (e.g., a user may press a button associated with the speakerphone function). Next, the process may disable (at 1220) multimedia playback (e.g., if the multimedia device is currently producing audio related to a media stream, the audio output may be disabled and/or a request to pause or stop the stream may be send to a connected device).

The process may then receive (at 1230) audio inputs (e.g., through a microphone of the multimedia device). Next, the process may convert (at 1240) the received input and send the resulting data to the connected mobile device. Such conversion may include analog to digital conversion, signal processing, and/or other appropriate operations. The data may be sent over a wireless communication link (e.g., Bluetooth).

Next, the process may receive (at 1250) data from the connected mobile device. Such data may include, for instance, audio data associated with the phone call. The process may then generate (at 1260) an audio output (e.g., by processing the received audio data and providing audio through a set of speakers) based at least partly on the data received from the mobile device.

Process 1200 may then determine (at 1270) whether the call has ended. Such a determination may be made in various appropriate ways (e.g., based on a message and/or command received from the mobile device, based on a user input received at the multimedia device, etc.). If the process determines (at 1270) that the process has not ended, the process may iteratively perform operations 1220-1270 until the process determines (at 1270) that the call has ended.

If the process determines (at 1270) that the call has ended, the process may automatically resume (at 1280) multimedia playback (if appropriate) and then end. Alternatively, if no media had been streaming prior to the call, the process may end after determining (at 1270) that the call has ended.

One of ordinary skill in the art will recognize that although process 1200 has been described by reference to various details, different embodiments may implement the process in various different ways without departing from the spirit of the invention. For instance, different embodiments may perform the operations in different orders. As another example, various operations may be omitted and/or various other operations may be included. The process may be executed continuously, at regular intervals, based on some criteria, and/or at other appropriate times. The process may be broken into a set of sub-process and/or be included as a sub-process of a larger macro-process.

IV. Exemplary Implementations

Figure 13:
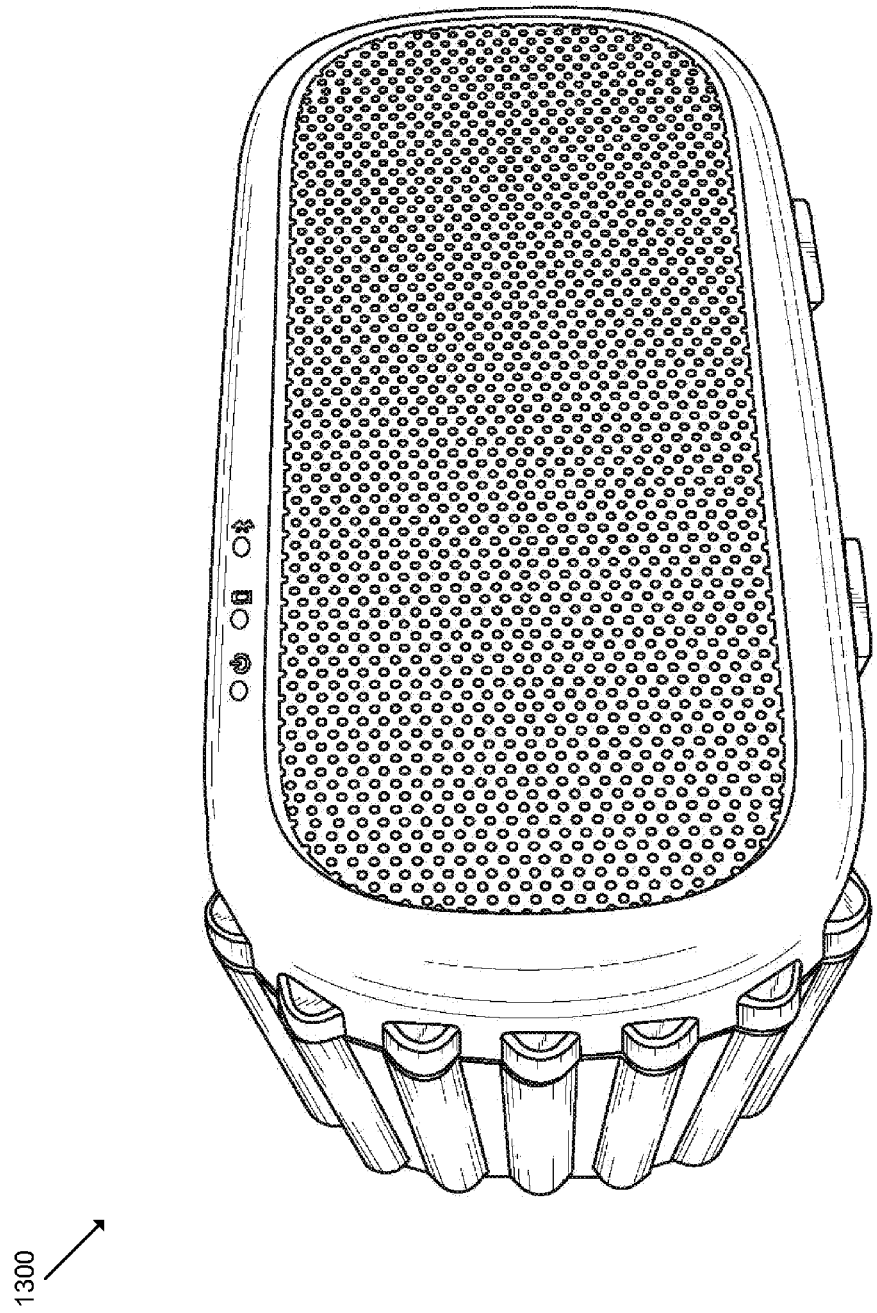
FIG. 13 illustrates a front-side perspective view of an exemplary portable speaker system of some embodiments.
Figure 14:
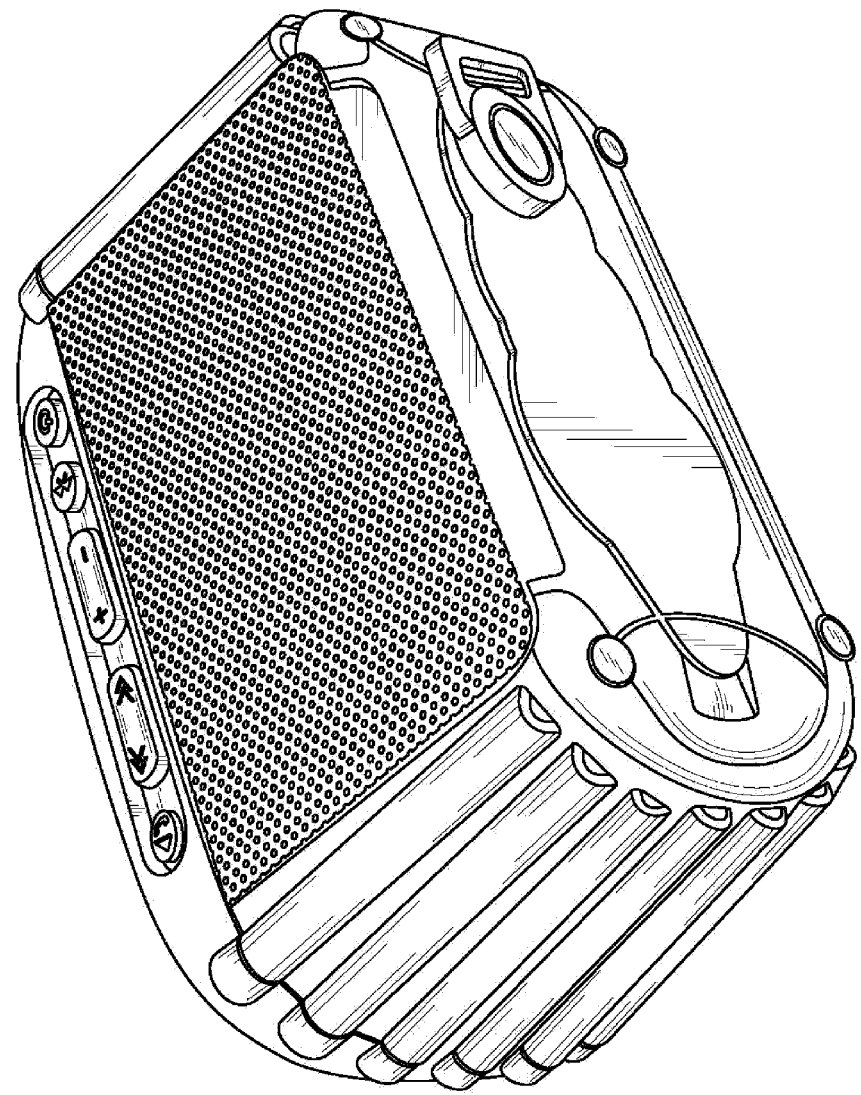
FIG. 14 illustrates a top-rear perspective view of the portable speaker system of FIG. 13.
Figure 15:
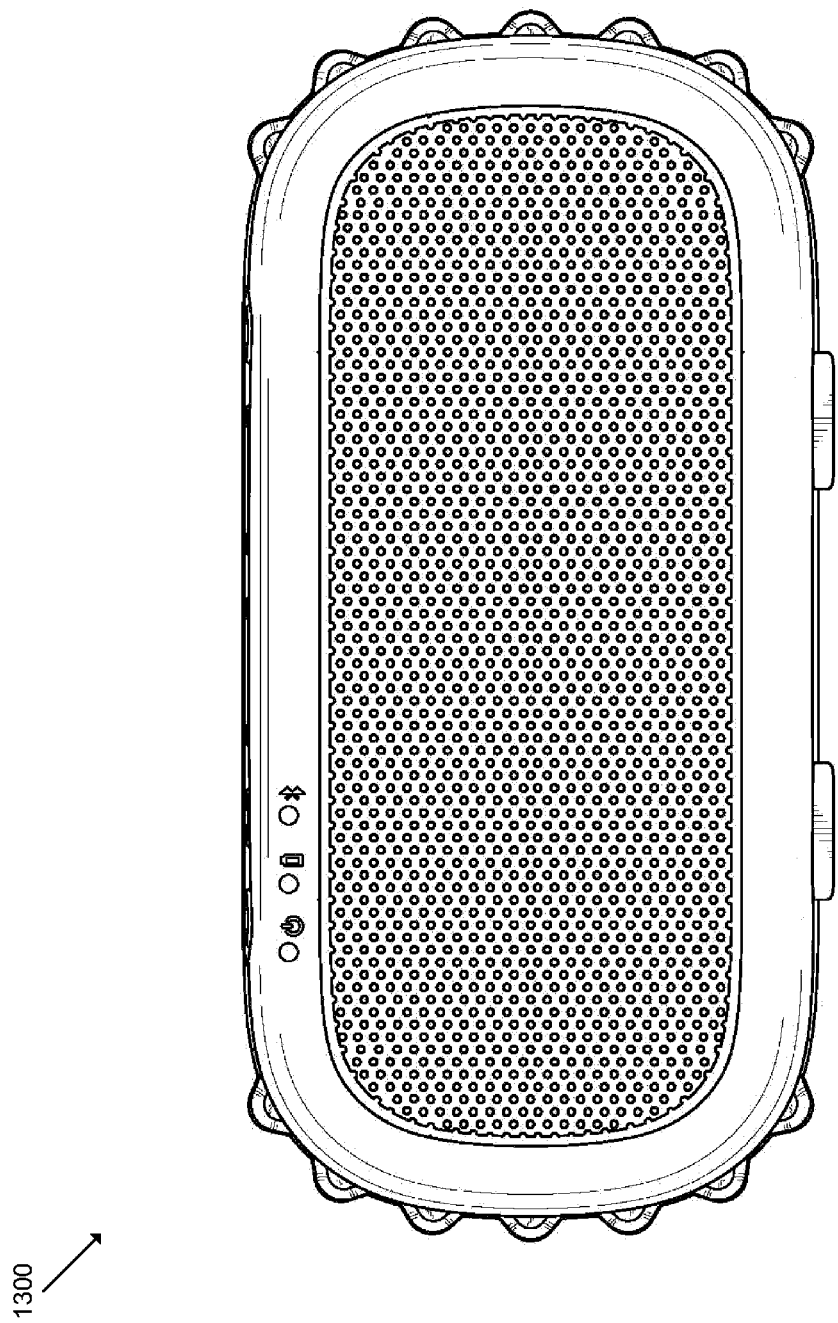
FIG. 15 illustrates a front elevation view of the portable speaker system of FIG. 13.
Figure 16:
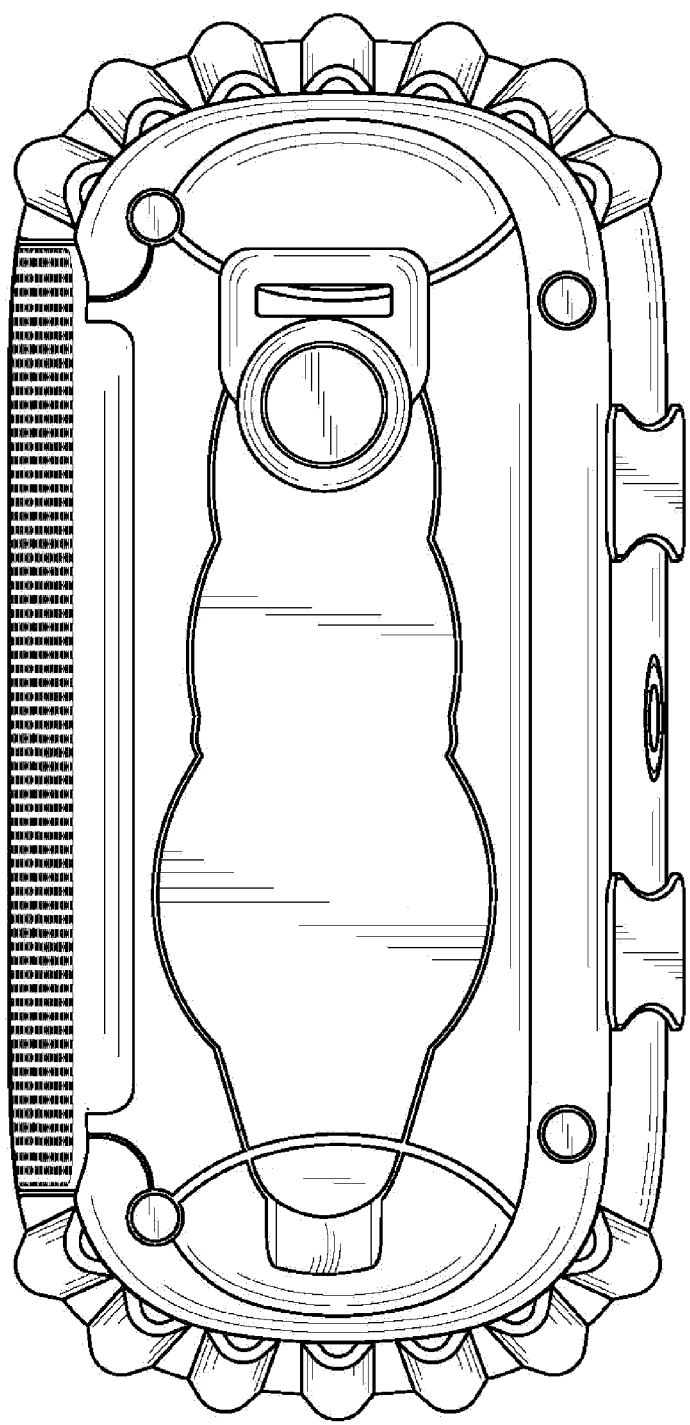
FIG. 16 illustrates a rear side elevation view of the portable speaker system of FIG. 13.
Figure 17:
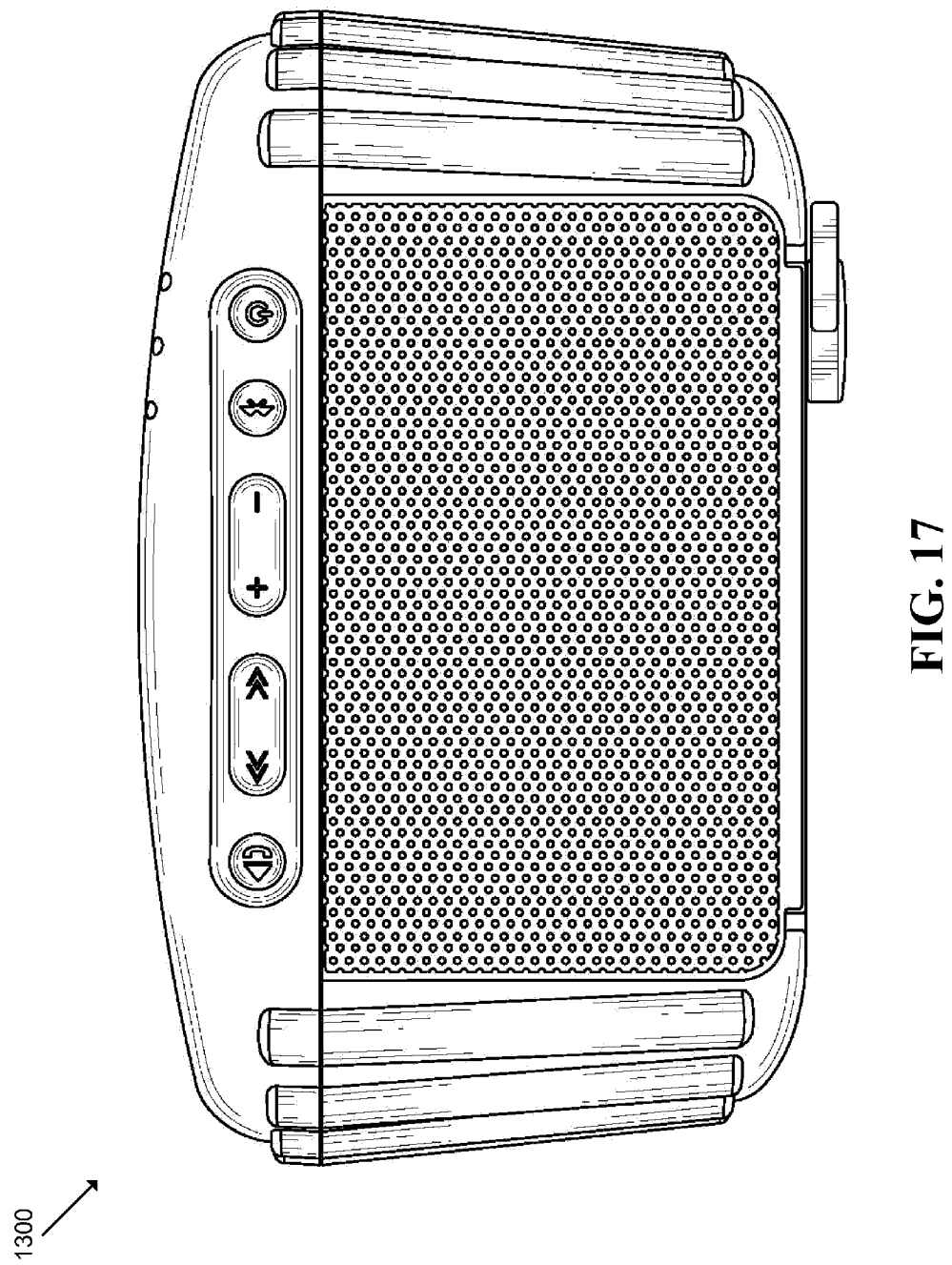
FIG. 17 illustrates a top plan view of the portable speaker system of FIG. 13.
Figure 18:
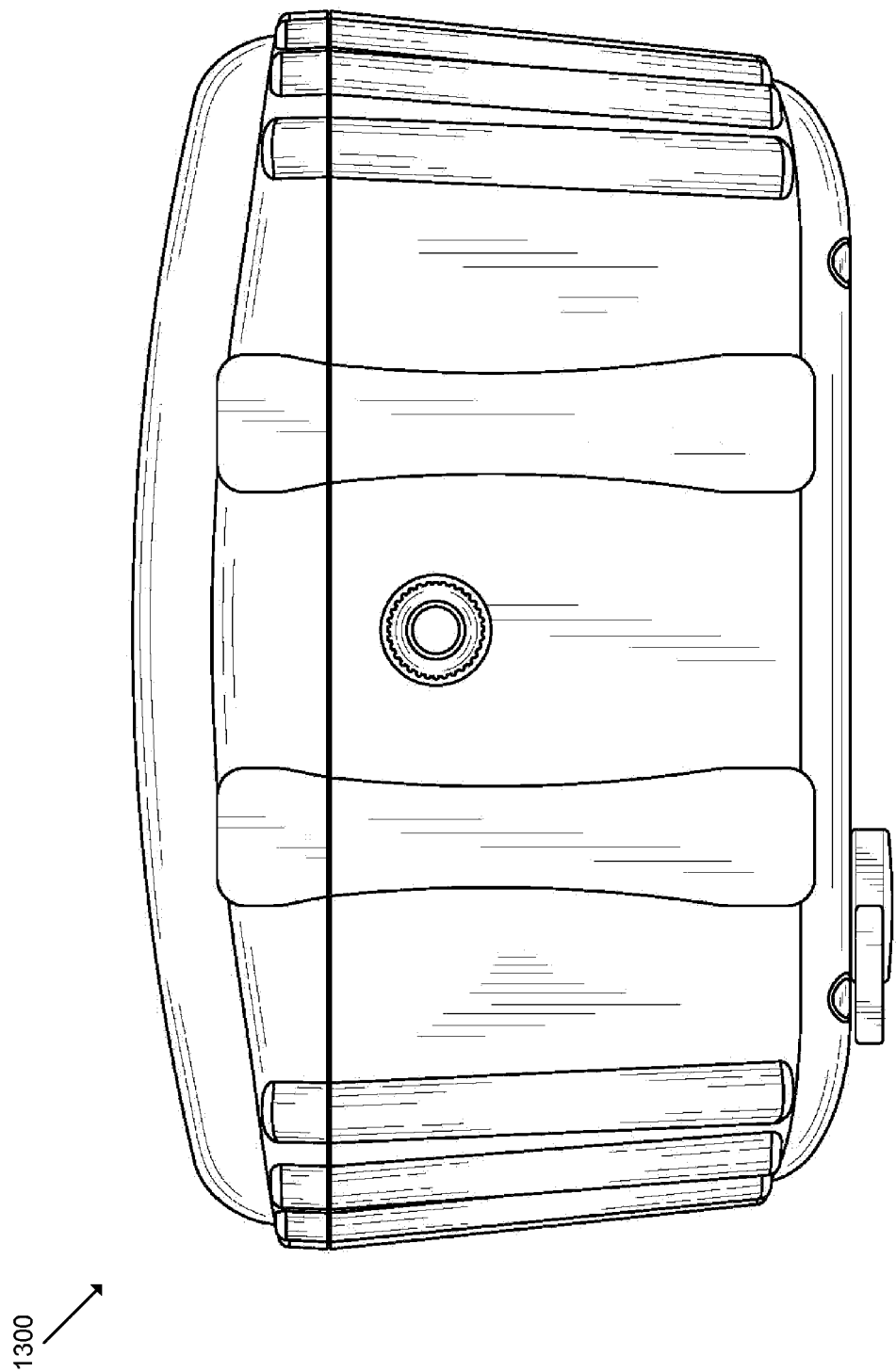
FIG. 18 illustrates a bottom plan view of the portable speaker system of FIG. 13.
Figure 19:
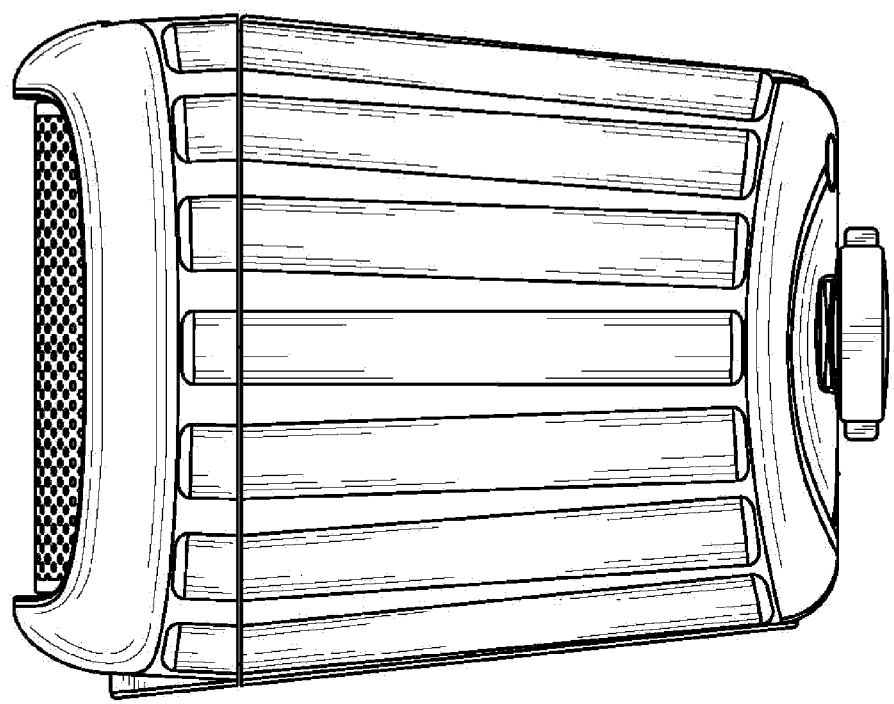
FIG. 19 illustrates a right elevation view of the portable speaker system of FIG. 13.
Figure 20:
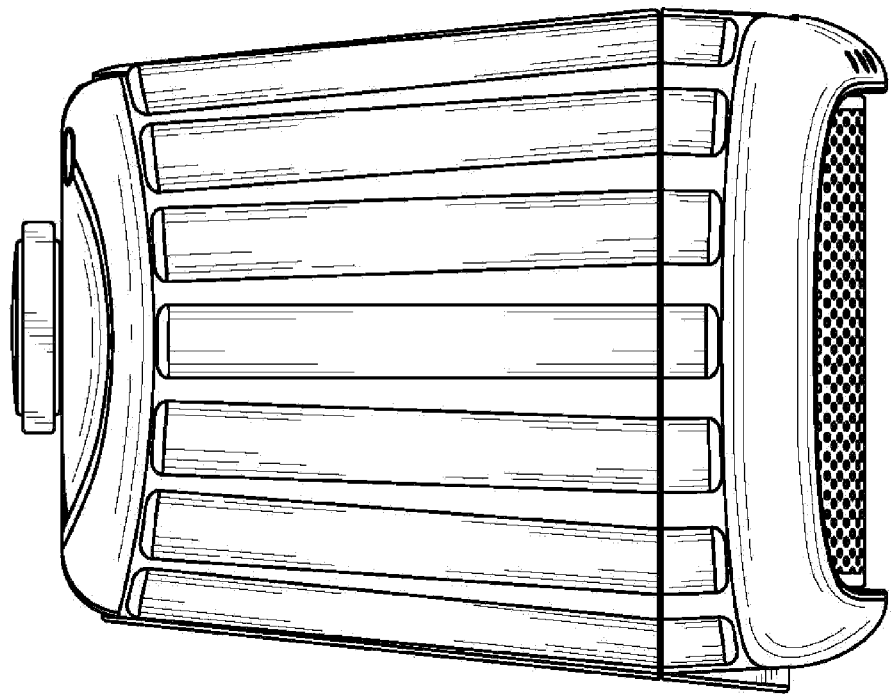
FIG. 20 illustrates a left elevation view of the portable speaker system of FIG. 13.

FIG. 13 illustrates a front-side perspective view of an exemplary portable speaker system 1300 of some embodiments. FIG. 14 illustrates a top-rear perspective view of the portable speaker system 1300. FIG. 15 illustrates a front elevation view of the portable speaker system 1300. FIG. 16 illustrates a rear side elevation view of the portable speaker system 1300. FIG. 17 illustrates a top plan view of the portable speaker system 1300. FIG. 18 illustrates a bottom plan view of the portable speaker system 1300. FIG. 19 illustrates a right elevation view of the portable speaker system 1300. FIG. 20 illustrates a left elevation view of the portable speaker system 1300.

Figure 21:
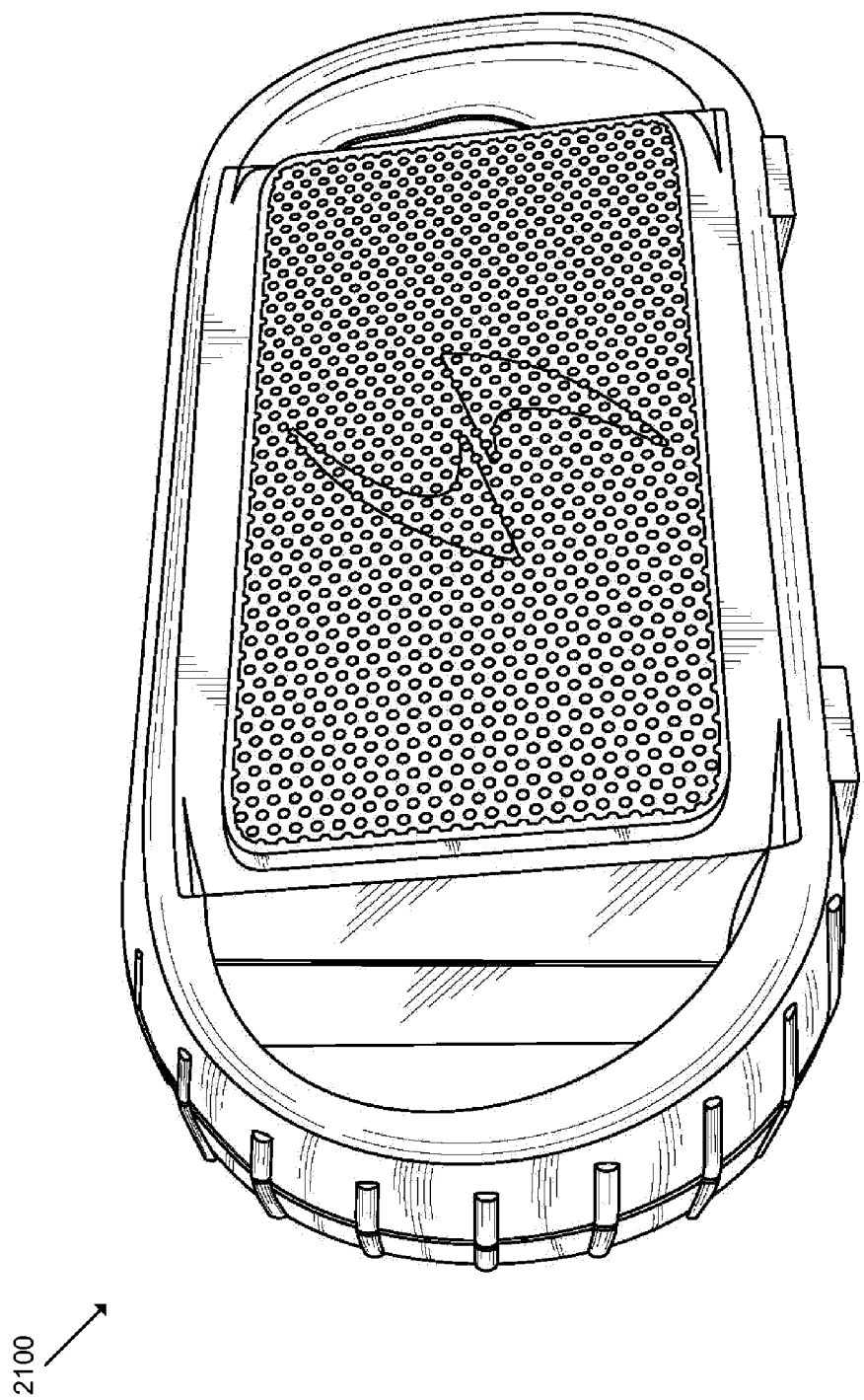
FIG. 21 illustrates a front-side perspective view of an exemplary portable speaker system of some embodiments.
Figure 22:
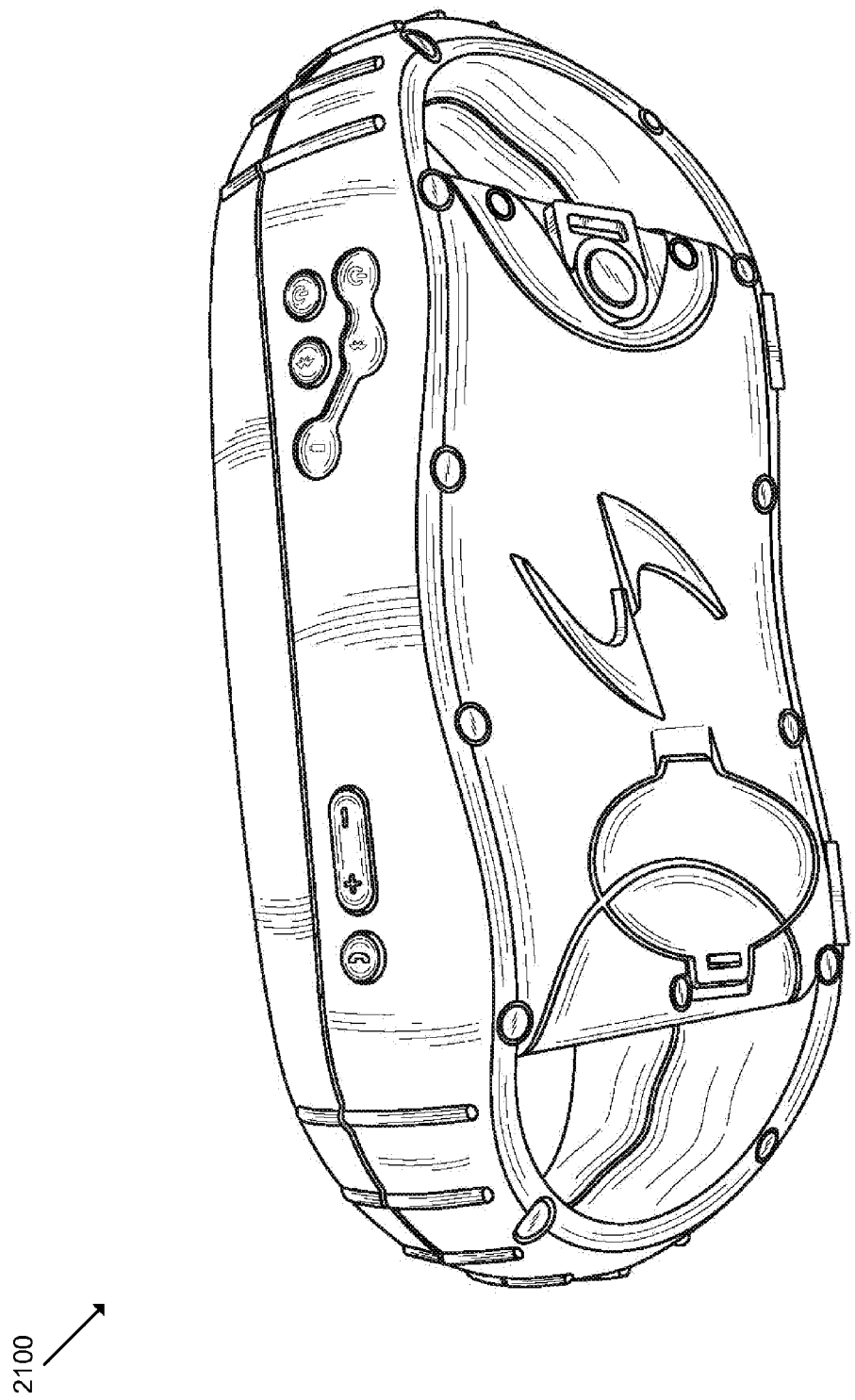
FIG. 22 illustrates a top-rear perspective view of the portable speaker system of FIG. 21.
Figure 23:
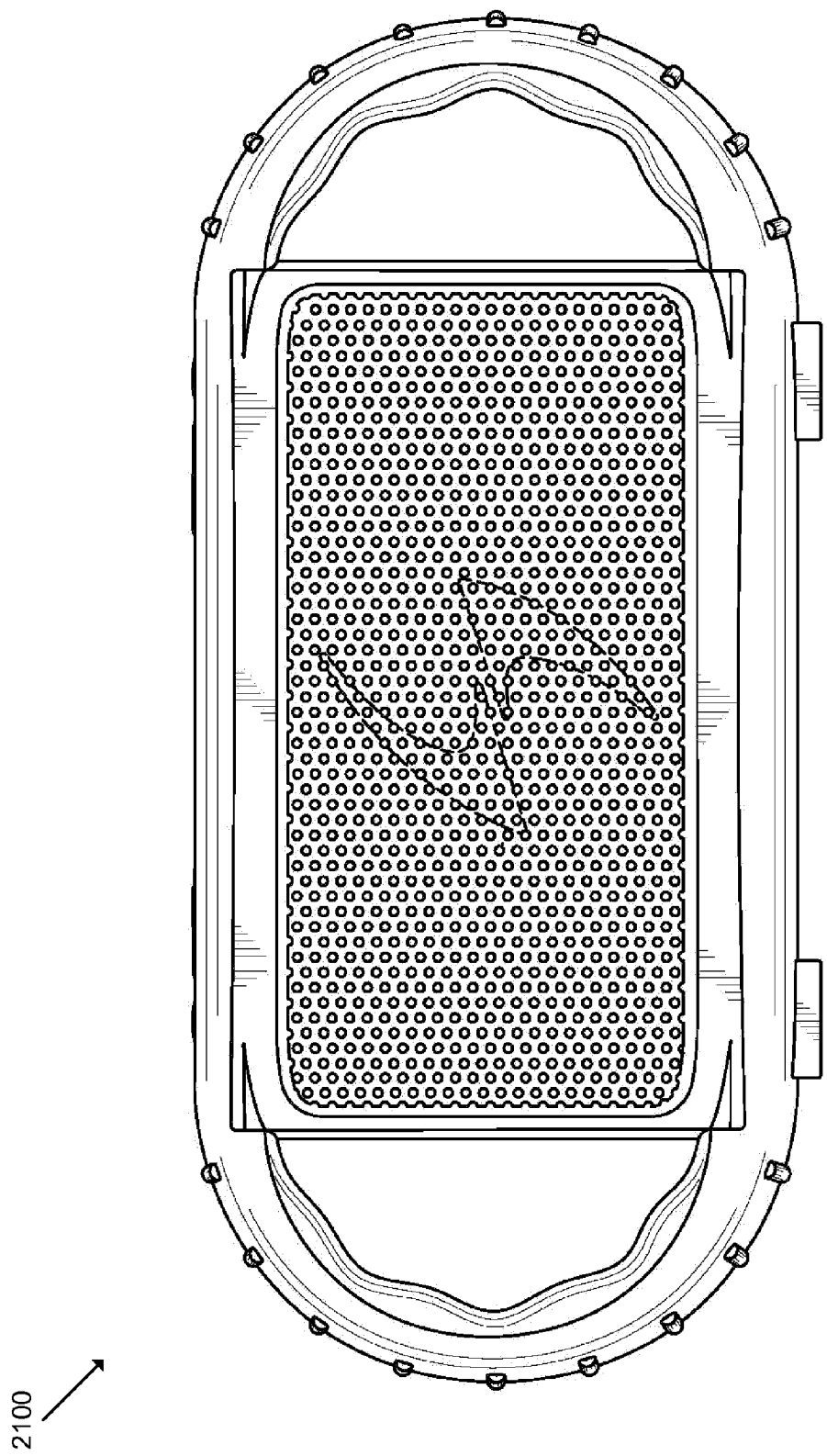
FIG. 23 illustrates a front elevation view of the portable speaker system of FIG. 21.
Figure 24:
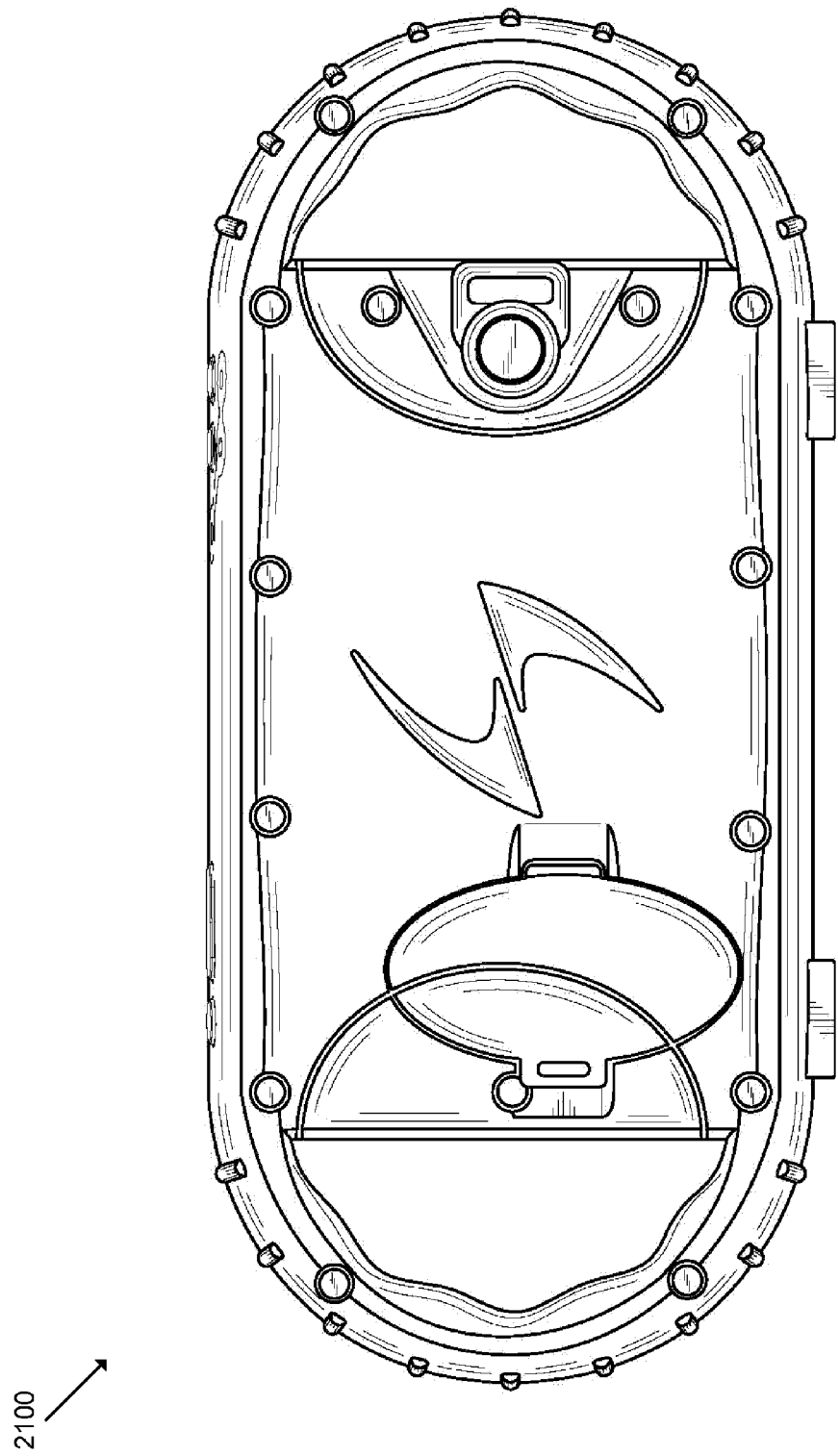
FIG. 24 illustrates a rear side elevation view of the portable speaker system of FIG. 21.
Figure 25:
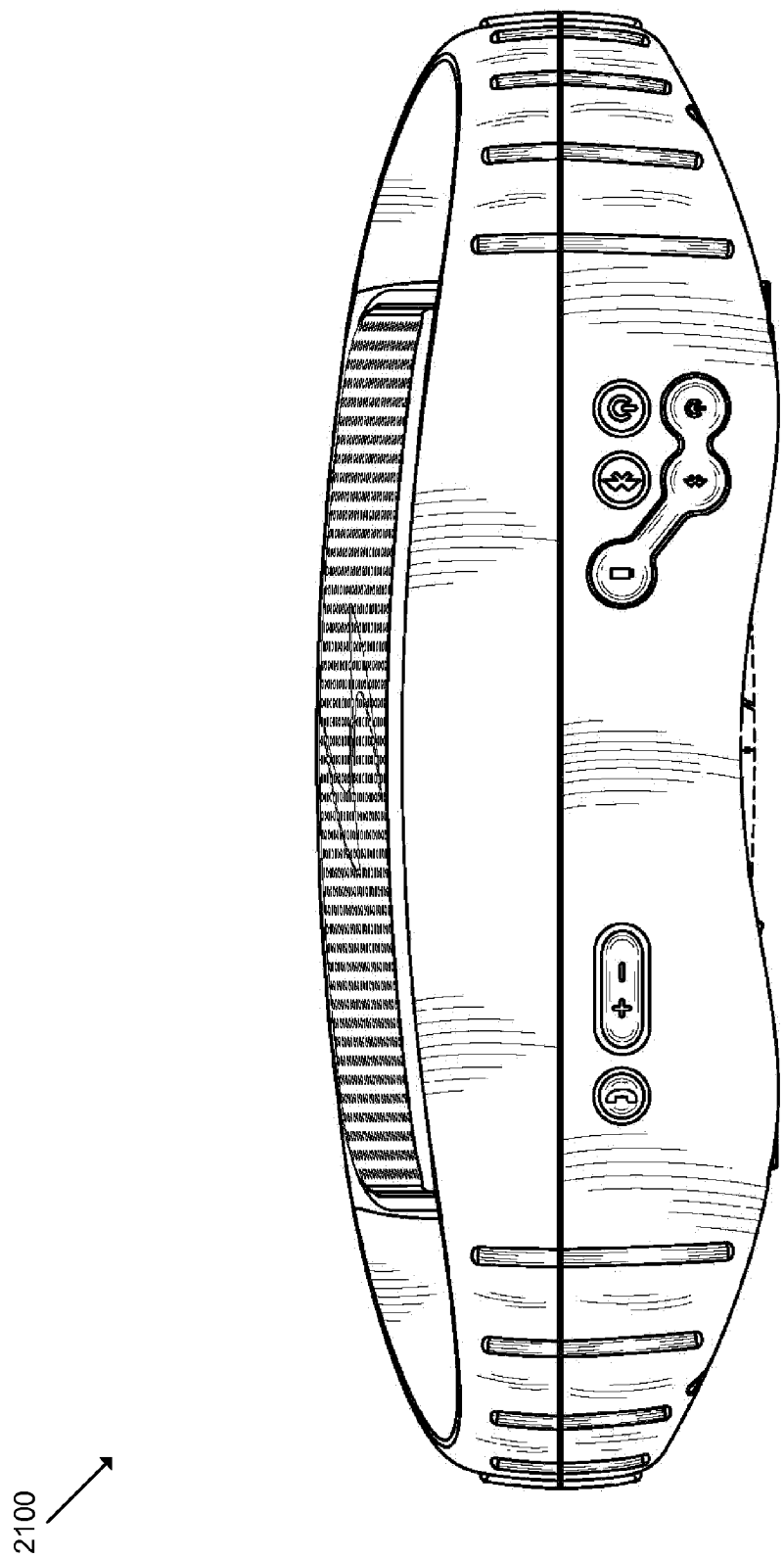
FIG. 25 illustrates a top plan view of the portable speaker system of FIG. 21.
Figure 26:
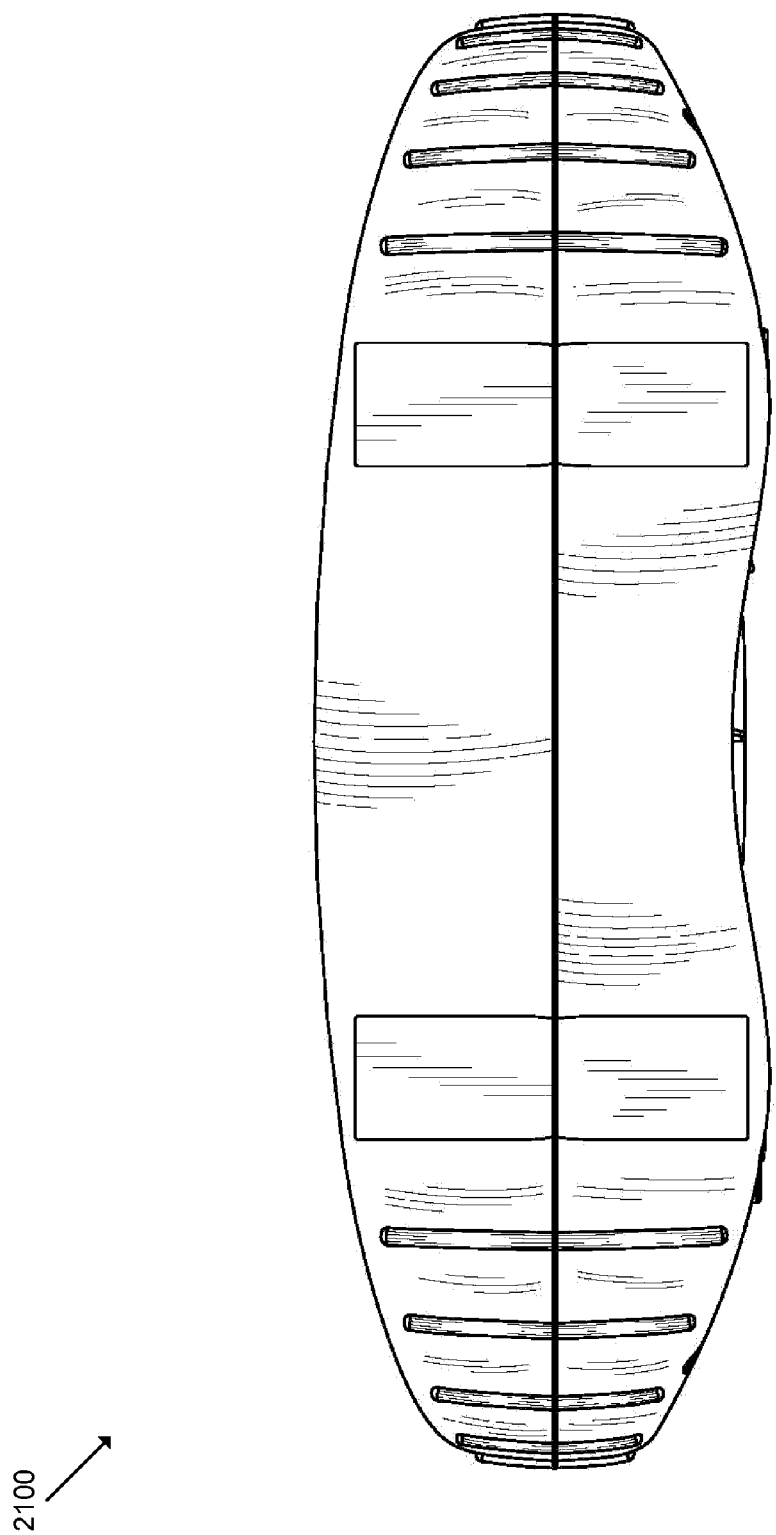
FIG. 26 illustrates a bottom plan view of the portable speaker system of FIG. 21.
Figure 27:
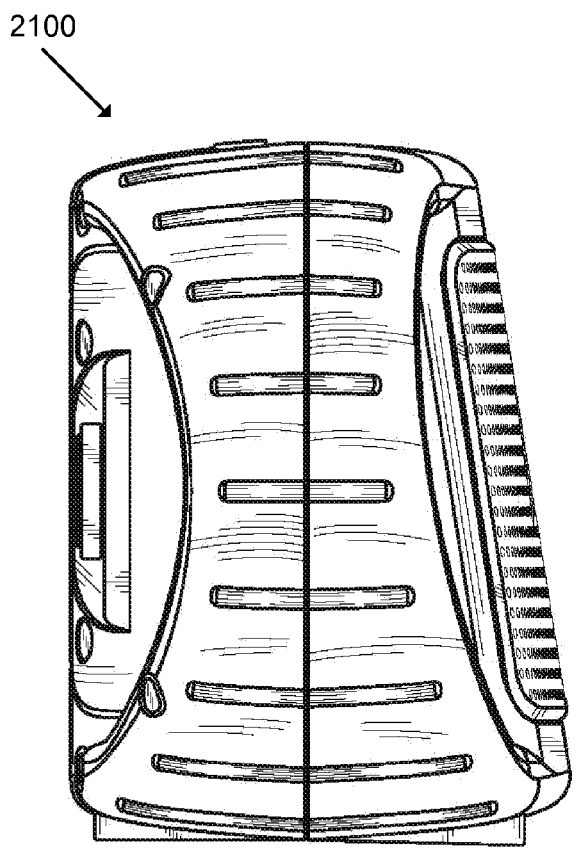
FIG. 27 illustrates a right elevation view of the portable speaker system of FIG. 21.
Figure 28:
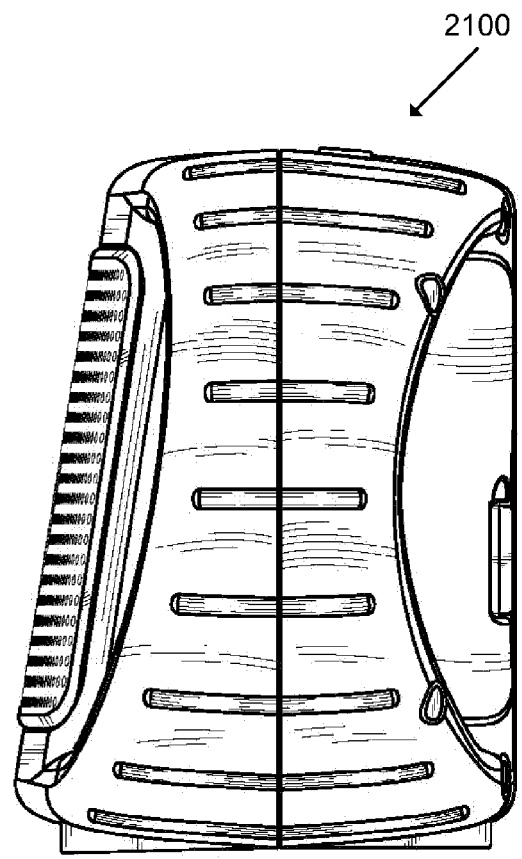
FIG. 28 illustrates a left elevation view of the portable speaker system of FIG. 21.

FIG. 21 illustrates a front-side perspective view of an exemplary portable speaker system 2100 of some embodiments. FIG. 22 illustrates a top-rear perspective view of the portable speaker system 2100. FIG. 23 illustrates a front elevation view of the portable speaker system 2100. FIG. 24 illustrates a rear side elevation view of the portable speaker system 2100. FIG. 25 illustrates a top plan view of the portable speaker system 2100. FIG. 26 illustrates a bottom plan view of the portable speaker system 2100. FIG. 27 illustrates a right elevation view of the portable speaker system 2100. FIG. 28 illustrates a left elevation view of the portable speaker system 2100.

As shown, the exemplary portable speaker systems 1300 and 2100 may include various features described above in reference to FIGS. 1, 4A-4B, 5A-5B, 6A-6B, 7A-7B, and 8. In addition, the exemplary systems 1300 and 2100 may be able to perform the operations described above in reference to FIGS. 10-12.

One of ordinary skill in the art will recognize that the exemplary systems 1300 and 2100 may be implemented in various different ways without departing from the spirit of the invention. For instance, different embodiments may include housings with different shapes, sizes, external features, etc. As another example, different embodiments may include various different UI elements than those shown.

V. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors ("DSP"), Application-Specific ICs ("ASIC"), Field Programmable Gate Arrays ("FPGA"), etc.) the instructions cause the computational element(s) to perform actions specified in the instructions.

Figure 29:
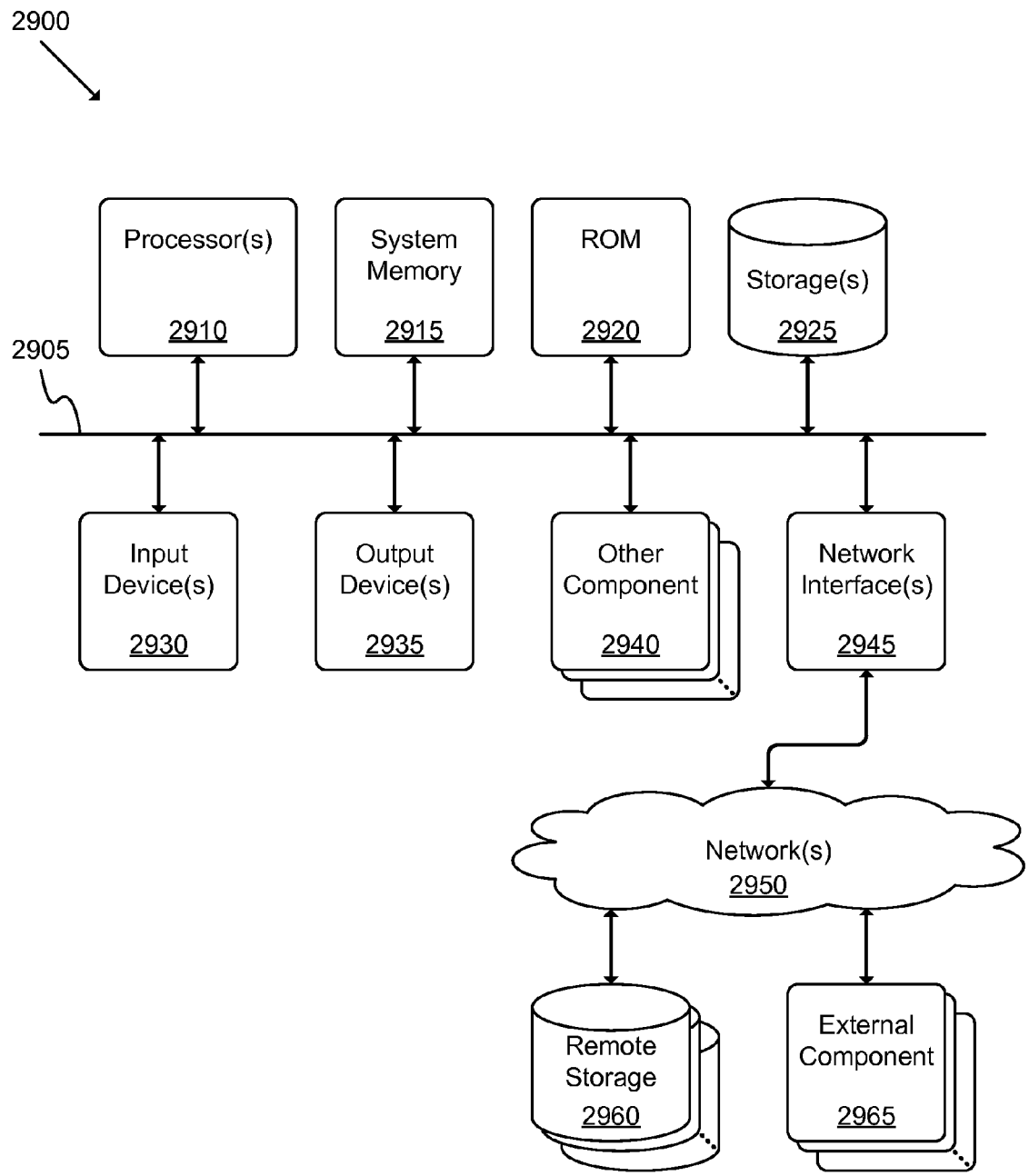
FIG. 29 illustrates a schematic block diagram of a conceptual computer system with which some embodiments of the invention may be implemented.

FIG. 29 conceptually illustrates a schematic block diagram of a computer system 2900 with which some embodiments of the invention may be implemented. For example, the systems described above in reference to FIGS. 2-3 may be at least partially implemented using computer system 2900. As another example, the processes described in reference to FIGS. 9-12 may be at least partially implemented using sets of instructions that are executed using computer system 2900.

Computer system 2900 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 2900 may include a bus 2905, at least one processing element 2910, a system memory 2915, a read-only memory ("ROM") 2920, other components (e.g., a graphics processing unit) 2925, input devices 2930, output devices 2935, permanent storage devices 2940, and/or network interfaces 2945. The components of computer system 2900 may be electronic devices that automatically perform operations based on digital and/or analog input signals.

Bus 2905 represents all communication pathways among the elements of computer system 2900. Such pathways may include wired, wireless, optical, and/or other appropriate communication pathways. For example, input devices 2930 and/or output devices 2935 may be coupled to the system 2900 using a wireless connection protocol or system. The processor 2910 may, in order to execute the processes of some embodiments, retrieve instructions to execute and data to process from components such as system memory 2915, ROM 2920, and permanent storage device 2940. Such instructions and data may be passed over bus 2905.

ROM 2920 may store static data and instructions that may be used by processor 2910 and/or other elements of the computer system. Permanent storage device 2940 may be a read-and-write memory device. This device may be a non-volatile memory unit that stores instructions and data even when computer system 2900 is off or unpowered. Permanent storage device 2940 may include a mass-storage device (such as a magnetic or optical disk and its corresponding disk drive).

Computer system 2900 may use a removable storage device and/or a remote storage device as the permanent storage device. System memory 2915 may be a volatile read-and-write memory, such as a random access memory ("RAM"). The system memory may store some of the instructions and data that the processor uses at runtime. The sets of instructions and/or data used to implement some embodiments may be stored in the system memory 2915, the permanent storage device 2940, and/or the read-only memory 2920. Other components 2925 may perform various other functions.

Input devices 2930 may enable a user to communicate information to the computer system and/or manipulate various operations of the system. The input devices may include keyboards, cursor control devices, audio input devices and/or video input devices. Output devices 2935 may include printers, displays, and/or audio devices. Some or all of the input and/or output devices may be wirelessly or optically connected to the computer system.

Finally, as shown in FIG. 29, computer system 2900 may be coupled to a network 2950 through a network interface 2945. For example, computer system 2900 may be coupled to a web server on the Internet such that a web browser executing on computer system 2900 may interact with the web server as a user interacts with an interface that operates in the web browser. Computer system 2900 may be able to access one or more remote storages 2960 and one or more external components 2965 through the network interface 2945 and network 2950.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2900 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention may be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

We claim:

1. A portable speaker system comprising:
   a waterproof enclosure;
   a wireless communication element enclosed within the waterproof enclosure, the wireless communication element able to receive audio data from a mobile device;
   a pair of speakers enclosed within the waterproof enclosure that are able to generate an audio output based on the audio data received from the mobile device; and
   a set of connection ports located within a first recessed area of the waterproof enclosure, the first recessed area including a flexible cover that is able to expose the first recessed area when in an open position and form a waterproof seal with the waterproof enclosure when in a closed position.

2. The portable speaker system of claim 1 further comprising a microphone, wherein the wireless communication element is able to send audio data to the mobile device based on signals received from the microphone.

3. The portable speaker system of claim 1 further comprising a passive woofer formed at least partly by an oval port in the waterproof enclosure.

4. The portable speaker system of claim 1, wherein the waterproof enclosure comprises:
   a first section;
   a gasket coupled to a portion of the first section; and
   a second section coupled to the gasket.

5. The portable speaker system of claim 1, wherein the waterproof enclosure comprises a set of user interface (UI) elements.

6. The portable speaker system of claim 5, wherein the UI elements comprise a set of buttons and a set of visual indicator elements, wherein the set of buttons includes at least one of a power button, a communication link button, a volume button, and a skip button and the set of visual indicator elements includes at least one of a continuous light, a blinking light, and a light able to generate a plurality of display colors.

7. The portable speaker system of claim 1, wherein the wireless communication element is able to establish a Bluetooth link with a mobile device.

8. The portable speaker system of claim 1 further comprising a set of shock absorption features comprising a plurality of ridges protruding from the waterproof enclosure.

9. The portable speaker system of claim 8, wherein the set of shock absorption features further comprise:
   a polycarbonate inner shell able to provide structural integrity for the device; and
   a thermoplastic elastomer cover coupled to an external surface of the inner shell.

10. The portable speaker system of claim 5, further comprising:
    a set of audio input elements located along the outer surface of the waterproof enclosure;
    a rechargeable battery enclosed within the waterproof enclosure, wherein:
      the set of UI elements is located within a second recessed area of an outer surface of the waterproof enclosure, and
      the pair of active speakers is located along an outer face of the waterproof enclosure.

11. The portable speaker system of claim 1, wherein at least one connection port from the set of connection ports comprises a universal serial bus (USB) connection.

12. The portable speaker system of claim 5, wherein the set of UI elements comprise:
    a device activation element;
    a wireless communication activation element;
    a volume control element;
    a playback control element; and
    a speakerphone activation element.

13. The portable speaker system of claim 1 further comprising a mounting feature able to allow the portable speaker system to be coupled to an external support element.

14. The portable speaker system of claim 1, wherein the waterproof enclosure is able to float on a body of water.

* * * * *